United States Patent Office 3,316,249
Patented Apr. 25, 1967

3,316,249
**5,10-DISUBSTITUTED-[5H]-DIBENZO-[b,e][1,4]-
DIAZEPIN-11(10H)-ONES**
Arthur R. Hanze, Kalamazoo, Mich., assignor to The Upjohn Company, Kalamazoo, Mich., a corporation of Delaware
No Drawing. Filed Aug. 28, 1962, Ser. No. 220,050
7 Claims. (Cl. 260—239.3)

This invention pertains to novel organic chemical compounds, to novel intermediates and derivatives, and to a novel process for preparing the same. More particularly, the invention is directed to novel 5,10-disubstituted-[5H]-dibenzo-[b,e][1,4]-diazepin-11(10H)-ones and acid addition and quaternary ammonium salts thereof; novel 5-(aminoalkyl) - [5H] - dibenzo - [b,e][1,4] - diazepin-11 (10H)-one intermediates and acid addition salts thereof; novel 10,11-dihydro- and N-oxide derivatives of said 5-(aminoalkyl) - [5H] - dibenzo-[b,e][1,4]-diazepin - 11 (10H)-one intermediates; novel hydrocarbyl N-(aminoalkyl)-N-(2-aminophenyl)anthranilate intermediates and acid addition salts thereof; and novel hydrocarbyl N-(aminoalkyl)-N-(2-nitrophenyl)anthranilate intermediates and acid addition salts thereof. As stated, the invention is directed also to a novel process for preparing the foregoing novel compounds, intermediates, and derivatives.

The novel 5,10-disubstituted-[5H] -dibenzo-[b,e][1,4]-diazepin-11(10H)-one free base compounds of this invention have the structural formula

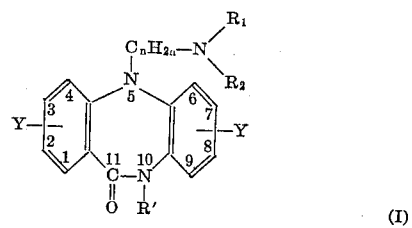

(I)

wherein $R_1$ and $R_2$ taken separately are selected from the group consisting of hydrogen and lower-alkyl, for example, methyl, ethyl, propyl, butyl, and isomeric forms thereof, and taken together with —N< constitute a saturated heterocyclic amino radical

of from 5 to 7 nuclear atoms, inclusive, wherein Z is a saturated bivalent radical selected from the group consisting of alkylene, oxadialkylene, and thiadialkylene; $—C_nH_{2n}—$ is branched or straight chain alkylene having at least 2 carbon atoms between the valences, for example, ethylene, propylene, trimethylene, tetramethylene, butylene, dimethylethylene, and the like; $n$ is an integer from 2 to 4, inclusive; R' is selected from the group consisting of lower-alkyl as exemplified above and the

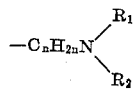

group as defined above; and Y is selected from the group consisting of hydrogen, chlorine, fluorine, trifluoromethyl, lower-alkyl as defined above, and lower-alkoxy, for example, methoxy, ethoxy, propoxy, butoxy, and isomeric forms thereof. These compounds of the invention in their free base form and the form of pharmacologically acceptable acid addition and quaternary ammonium salts are anticholinergics and antihistaminics. They may be administered to mammals and birds via both oral and parenteral routes in order to produce their pharmacological effects.

The novel 5-(aminoalkyl)-[5H]-dibenzo-[b,e][1,4]-diazepin-11(10H)-one intermediates of this invention have the structural formula

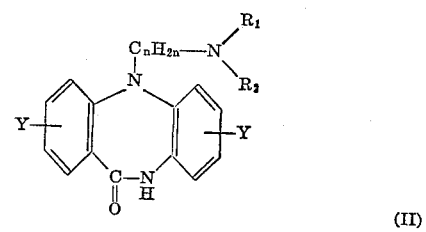

(II)

wherein $R_1$, $R_2$, Y, $—C_nH_{2n}—$, and $n$ are as defined above. The novel 10,11-dihydro- and N-oxide derivatives of these 5 - (aminoalkyl) - [5H]-dibenzo-[b,e][1,4]-diazepin-11(10H)-one intermediates (Formula II) have the structural formulae

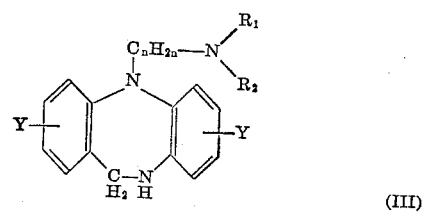

(III)

and

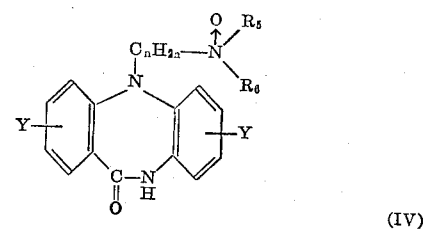

(IV)

respectively, wherein $R_1$, $R_2$, Y, $—C_nH_{2n}—$, and $n$ are as defined above and wherein $R_5$ and $R_6$ taken separately are lower-alkyl and taken together with —N< constitute the saturated heterocyclic amino radical

defined above. The N-oxides of 5-(aminoalkyl)-[5H]-dibenzo-[b,e][1,4]-diazepin-11(10H)-ones (Formula IV, above) are anticholinergics and antihistaminics; while the 5-(aminoalkyl)-10,11-dihydro-[5H]-dibenzo-[b,e][1,4]-diazepines (Formula III, above) are central nervous system stimulants and inhibit pseudocholinesterase.

The novel hydrocarbyl N-aminoalkyl-N-(2-aminophenyl)-anthranilate intermediates of this invention have the structural formula

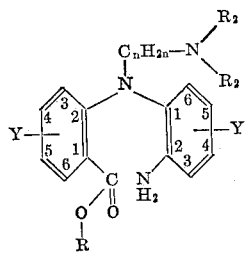 (V)

wherein $R_1$, $R_2$, Y, $-C_nH_{2n}-$, and $n$ are as defined above and R is hydrocarbyl of from 1 to 8 carbon atoms, inclusive.

The novel hydrocarbyl N-aminoalkyl-N-(2-nitrophenyl)-anthranilate intermediates of this invention have the structural formula

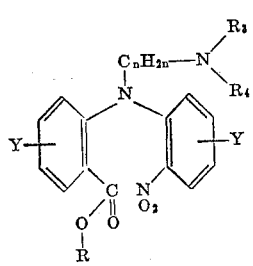 (VI)

wherein $R_3$ and $R_4$ taken separately are selected from the group consisting of benzyl and lower-alkyl and taken together with $-N<$ constitute the saturated heterocyclic amino radical

defined above, and R, Y, $-C_nH_{2n}-$, and $n$ are as defined above.

The term "hydrocarbyl of from 1 to 8 carbon atoms, inclusive," employed in describing the esters of N,N-disubstituted anthranilic acids within the scope of this invention means: (a) saturated and unsaturated acyclic, aliphatic hydrocarbon radicals such as alkyl, for example, methyl, ethyl, propyl, butyl, amyl, hexyl, heptyl, and octyl; alkenyl, for example, allyl, butenyl, pentenyl, hexenyl, heptenyl, and octenyl; and alkynyl, for example, propargyl, butynyl, pentynyl, hexynyl, heptynyl, and octynyl; (b) saturated and unsaturated cycloaliphatic hydrocarbon radicals such as cycloalkyl, for example, cyclopropyl, cyclobutyl, cyclopentyl, cyclohexyl, cycloheptyl, and cyclooctyl; and cycloalkenyl, for example, 2-cyclopentenyl, 1-cyclopentenyl, 2-cyclohexenyl and cyclooctenyl; (c) saturated and unsaturated cycloaliphaticalkyl hydrocarbon radicals such as cycloalkylalkyl, for example, cyclopentylmethyl, cyclohexylmethyl, and 2-cylohexylethyl; and cycloalkenylalkyl, for example, 2-cyclopentenylmethyl and 2-cyclohexenylmethyl; (d) saturated and un-saturated alkyl cycloaliphatic hydrocarbon radicals, for example, 2-methylcyclopentyl, and 4-ethylcyclohexyl; (e) aralkyl, for example, benzyl, α-methylbenzyl, and phenethyl; and (f) phenyl and alkylphenyl, for example, p-tolyl, 3,5-dimethylphenyl, and the like.

Similarly, the term "saturated heterocyclic amino radical

of from 5 to 7 nuclear atoms, inclusive," includes pyrrolidino, 2-methylpyrrolidino, 2-ethylpyrrolidino, 2,2-dimethylpyrrolidino, 3,4-dimethylpyrrolidino, 2-isopropylpyrrolidino, 2-sec-butylpyrrolidino, and like alkyl pyrrolidino groups, morpholino, 2-ethylmorpholino, 2-ethyl-5-methyl-morpholino, 3,3-dimethylmorpholino, thiamorpholino, 3-methylthiamorpholino, 2,3,6-trimethylthiamorpholino, piperidino, 2-methylpiperidino, 3-methylpiperidino, 4-methylpiperidino, 4-propylpiperidino, 2-propylpiperidino, 4-isopropylpiperidino, and like alkylpiperidino groups, hexamethyleneimino, 2-methylhexamethyleneimino, 3,6-dimethylhexamethyleneimino, homomorpholino, and the like.

In accordance with the process of the invention the novel 5,10-disubstituted-[5H]-dibenzo-[b,e,][1,4]-diazepin-11(10H)-ones having the Formula I are prepared by alkylating, with a lower-alkyl halide or an aminoalkyl halide having the formula

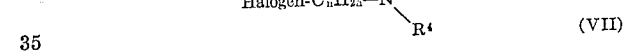 (VII)

wherein $R_3$, $R_4$, $-C_nH_{2n}-$, and $n$ are as defined above; and "Halogen" is chlorine or bromine, preferably chlorine, an alkali metal salt of a 5-(aminoalkyl)-[5H]-dibenzo-[b,e][1,4]-diazepin-11(10H)-one intermediate having the Formula II. When one or both of $R_3$ and $R_4$ are benzyl in the resulting 10-(aminoalkyl) compound, the corresponding N-monoalkyl or N-unsubstituted compound of Formula I is obtained by removing the benzyl group or groups from the nitrogen, preferably by catalytic hydrogenolysis.

Further in accordance with the process of the invention the novel 5-(aminoalkyl)-[5H]-dibenzo-[b,e][1,4]-diazepin-11(10H)-ones having the Formula II, above, are prepared by heating with or without solvent a hydrocarbyl N-(aminoalkyl)-N-(2-aminophenyl)anthranilate having the Formula V above. The hydrocarbyl N-(aminoalkyl)-N-(2-aminophenyl)anthranilates are prepared by reducing the nitro group of a hydrocarbyl N-(aminoalkyl)-N-(2-nitrophenyl)anthranilate having the Formula VI, above, which in turn is prepared by alkylating, with an aminoalkyl halide having the Formula VII, above a hydrocarbyl N-(2-nitrophenyl)anthranilate having the structural formula

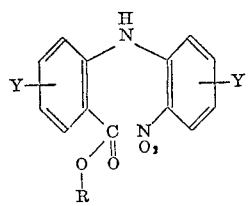 (VIII)

wherein Y is as defined above.

The process of the invention is illustrated in Table I.

Table I

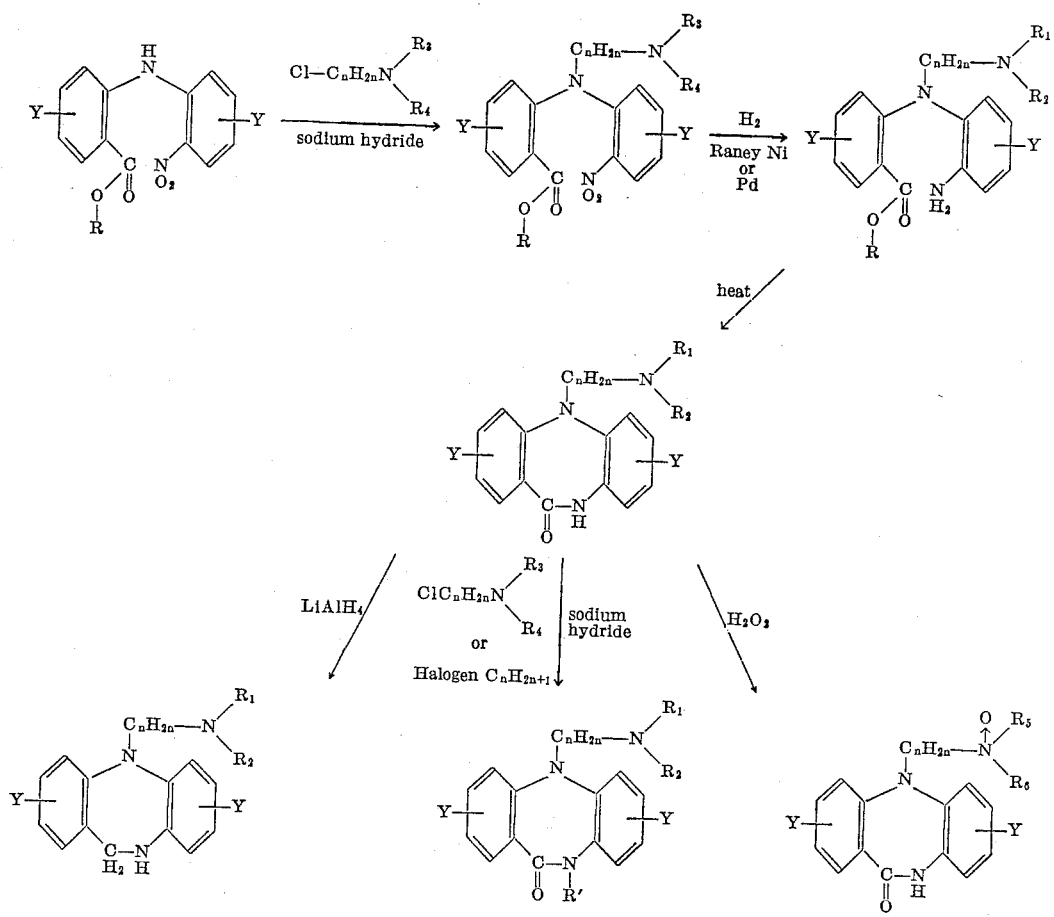

The hydrocarbyl N-(2-nitrophenyl)anthranilate starting compounds having the Formula VIII are obtained by reacting an anthranilic acid with a 1-halo-2-nitrobenzene to produce an N-(2-nitrophenyl)anthranilic acid and esterifying. The reaction of the anthranilic acid and the 1-halo-2-nitrobenzene can be carried out as described by Goldberg, Ber., 39, 1961 (1906). According to a preferred method, a 1-bromo-2-nitrobenzene is reacted with the anthranilic acid in the presence of n-amyl alcohol, a catalytic amount of powdered copper, and a base, e.g., potassium carbonate (preferred), calcium carbonate, and the like. The proportion of reactants is not critical, and stoichiometric proportions can be used. It is preferred, however, that an excess of the 1-bromo-2-nitrobenzene be used. The reaction is exothermic and proceeds at temperatures in the range of about 75° C. to about 250° C. The N-(2-nitrophenyl)-anthranilic acid is recovered by conventional methods, illustratively, by removing excess 1-bromo-2-nitrobenzene by steam distillation, and isolating the compound by acidification. The compound is purified by crystallization from a suitable solvent.

Ring-substituted hydrocarbyl N-(2-nitrophenyl)anthranilate starting compounds of Formula VIII wherein Y is chlorine, fluorine, trifluoromethyl, lower-alkyl, and lower-alkoxy are prepared according to the procedure described above employing the appropriate ring-substituted anthranilic acids and 1-halo-2-nitrobenzenes. Such ring-substituted anthranilic acids and ring-substituted 1-halo-2-nitrobenzenes are known or can be prepared according to known methods. Representative known anthranilic acids include 3-chloroanthranilic acid, 4-chloro-, 5-chloro-, 6-chloro-, 4-fluoro-, 5-fluoro-, 6-fluoro-, 4-ethoxy-, 3-methoxy-, 4-methoxy-, 5-methoxy-, 3-methyl-, 4-methyl-, 5-methyl-, 6-methyl-, 4-tert-butyl-, 3,4-dichloro-, 3,5-dichloro-, 3,6-dichloro-, 4,5-dichloro-, 4,6-dichloro-, 3,4-dimethoxy-, 3,5-dimethoxy-, 5,6-dimethoxy-, 3,4-dimethyl-, 3,5-dimethyl-, 3,6-dimethyl-, 4,5-dimethyl, 4,6-dimethyl-, 5,6-dimethyl-, 3-methoxy-4-methyl-, 4-ethoxy-3-methylanthranilic acids, and the like.

Representative known 1-bromo-2-nitrobenzenes include 1-bromo-3-chloro-2-nitrobenzene, 1-bromo-4-chloro-2-nitrobenzene, 1-bromo-4-fluoro-2-nitrobenzene, 1-bromo-4,5-difluoro-2-nitrobenzene, 1-bromo-3-ethyl-2-nitrobenzene, 1-bromo-4-ethyl-2-nitrobenzene, 1-bromo-4-tert-butyl-2-nitrobenzene, 1-bromo-4-methoxy-2-nitrobenzene, 1-bromo-4,5-di-n-butoxy-2-nitrobenzene, 1-bromo-4,5,6-trimethoxy-2-nitrobenzene, and the like.

The N-(2-nitrophenyl)anthranilic acids are preferably converted to hydrocarbyl esters before the alkylation reaction, since the alkylation reaction gives better yields with the ester. Moreover, the 2-nitro group can be subsequently reduced to amino more smoothly in the ester form. Any hydrocarbon alcohol can be used in the process and the esters are prepared by conventional esterification procedures such as heating the anthranilic acid with an alcohol, for example, methanol, propanol, cyclohexanol, or other hydrocarbon alcohols in the presence of catalytic amounts of a strong mineral acid such as hydrochloric acid. A preferred class of hydrocarbon alcohols are those providing hydrocarbyl groups of the kind exemplified above. The ester is recovered and purified by conventional procedures such as filtration, distillation, precipitation, washing to remove traces of solvent and impurities, and drying.

Alkylation of the amino nitrogen of a hydrocarbyl N-(2-nitrophenyl)anthranilate having the Formula VIII, above is, accomplished by reacting the compound in the form of its alkali metal salt with an aminoalkyl halide having the Formula VII, above. Advantageously, the alkylation is carried out in the presence of an inert organic solvent (e.g., toluene, benzene, dimethylformamide, dioxane, and the like), using susbtantially equimolar amounts of the anthranilate and an alkali metal amide or hydride (e.g., sodium amide, sodium hydride, and the like) to form the alkali metal salt, and reacting the salt with the amino-alkyl halide. The proportion of reactants is not critical and stoichiometric amounts or an excess of either can be employed. The reaction is advantageously carried out in the absence of oxygen, for example, in an atmosphere of nitrogen, and is promoted by heating at the reflux temperature for several hours or more. The resulting hydrocarbyl N-(aminoalkyl)-N-(2-nitrophenyl) anthranilate having the Formula VI is recovered by conventional methods such as removing the solvent, extraction, filtration, and drying.

When it is desired that one or both of $R_1$ and $R_2$ of the compounds of Formula V be hydrogen, a N-benzyl-N-lower-alkylamino-lower-alkyl halide or an N,N-dibenzylamino-lower-alkyl halide is used in the alkylation procedure described above and the benzyl group or groups are removed from the resulting compounds of Formula VI, above, by catalytic hydrogenolysis, either prior to the reduction of the 2-nitro group to 2-amino or coincidentally therewith. Conveniently, the hydrogenolysis and reduction are accomplished at the same time in the presence of hydrogen and preferably with a palladium catalyst, e.g., palladium on charcoal.

Reduction of the 2-nitro group of the hydrocarbyl N-(aminoalkyl)-N-(2-nitrophenyl)anthranilate to a 2-amino is conveniently accomplished by any of the well-known methods for reducing nitro groups to amino groups. Illustratively, a hydrocarbyl N-(aminoalkyl)-N-(2-nitrophenyl)anthranilate intermediate can be readily reduced with hydrogen at about 50 lbs. pressure in the presence of a catalyst and an inert organic solvent such as an alcohol, for example, methanol, ethanol, propanol, and the like. Thus, catalytic hydrogenation can be employed in the presence of a noble metal catalyst, such as palladium (advantageously supported on charcoal, calcium carbonate, or other conventional supports), platinum, and the like; or a base metal catalyst such as Raney nickel, Raney cobalt, and the like; and in the presence of an inert solvent such as dioxane, methyl alcohol, ethyl alcohol, isopropyl alcohol, and the like. Pressures ranging from about atmospheric pressure to about 50 lbs. per square inch and temperature conditions ranging from about 10° C. to about 50° C. can be employed in conducting the hydrogenation; 40 lbs. pressure and reaction temperatures of from about 20° C. to about 30° C. ordinarily being preferred. Alternatively, chemical reducing agents can be employed, e.g., ammonium sulfide, ferrous sulphate in alkaline solution, Clemo et al., J. Chem. Soc. 1924, p. 1770, or stannous chloride, McCombie et al., J. Chem. Soc. 1928, p. 358; or electrolytic reduction can be employed, e.g., in the presence of a mixture of dioxane and dilute hydrochloric acid. Other suitable methods are described in Kirk and Othmer, Encyclopedia of Chemical Technology, vol. 1, pages 673 to 691. Catalytic hydrogenation is preferred, particularly catalytic hydrogenation in the presence of a noble metal catalyst such as palladium.

Cyclization of a thus prepared hydrocarbyl N-(aminoalkyl)-N-(2-aminophenyl)anthranilate having the Formula V, above, is conveniently effected by heating the free base either in the presence of a solvent or without a solvent. Conveniently, the anthranilate may be heated over a range of temperatures from about 65° C. to about 200° C. or even higher. The desired 5-(aminoalkyl)-[5H]-dibenzo-[b,e][1,4]-diazepin-11(10H) - one having the Formula II, above, is recovered by conventional procedures such as dissolving in an inert organic solvent, e.g., ether, methyl ethyl ketone, and the like, filtration, evaporation of solvent, and crystallization. Conveniently, the cyclization can be accomplished by heating the starting material in an autoclave at about 100° C. for about twelve hours in the presence of an inert organic solvent such as methanol, ethanol, propanol, and the like. The product is recovered by evaporating the solvent and crystallizing the 5-(aminoalkyl)-[5H]-dibenzo-[b,e][1,4]-diazepin-11(10H)-one. Ring closure can also be effected by refluxing the anthranilate in an alcohol such as methanol, for about 40 to 50 hours.

Alkylation of the 10-nitrogen of a thus-obtained 5-(aminoalkyl)-[5H]-dibenzo-[b,e][1,4]diazepin-11(10H)-one to obtain a compound having the Formula I, above, is conveniently accomplished in accordance with the alkylation procedure described above.

The novel 5-(aminoalkyl)-10,11-dihydro-[5H]-dibenzo-[b,e][1,4]diazepines (Formula III, above) of this invention are prepared by reducing, with lithium aluminum hydride, a 5-(aminoalkyl)-[5H]-dibenzo-[b,e][1,4]-diazepin-11(10H)-one in the presence of an inert organic solvent. The reduction is preferably conducted in the absence of air, e.g., in an inert atmosphere, for example, nitrogen. Suitable organic solvents include diethyl ether, diisopropyl ether, tetrahydrofuran, dioxane, and the like. The reaction is conveniently carried out by refluxing a solution of the 5-(aminoalkyl)-[5H]-dibenzo-[b,e][1,4]-diazepin-11(10H)-one and lithium aluminum hydride. The resulting 5-(aminoalkyl)-10,11-dihydro-[5H]-dibenzo-[b,e][1,4]-diazepine is recovered by conventional methods such as filtration, solvent evaporation, distillation, solvent extraction, and crystallization.

The novel N-oxides (Formula IV, above) of the novel 5 - (aminoalkyl) - [5H] - dibenzo-[b,e][1,4]-diazepin-11(10H)-one intermediates of this invention are prepared by reacting a 5-(aminoalkyl)-[5H]-dibenzo-[b,e][1,4]-diazepin-11(10H)-one intermediate with a peroxidizing agent, for example, hydrogen peroxide, perbenzoic acid, perphthalic acid, peracetic acid, benzoyl peroxide, persulfuric acid, permonosulfuric acid (Caro's acid), and ozone. The reaction is advantageously carried out in a solvent, illustratively, glacial acetic acid, aqueous acetic acid, ethanol, aqueous ethanol, acetone, and aqueous acetone. The reaction proceeds at about 25° C.; however, higher or lower temperatures can be used, for example, the reaction mixture can be heated to about 50° to about 100° C. in order to enhance the rate of oxidation. The N-oxides are separated from the reaction mixture and recovered in pure form by conventional procedures such as filtration, solvent evaporation, solvent extraction, distillation, and crystallization.

The 10,11-dihydro- and N-oxide derivatives of the novel 5,10 - disubstituted-[5H]-dibenzo-[b,e][1,4]-diazepin-11(10H)-ones of this invention can be prepared in the same manner. For example, the 5,10-disubstituted-[5H]-dibenzo-[b,e][1,4]-diazepin-11(10H)-ones can be reduced with lithium aluminum hydride or reacted with a peroxidizing agent to form the corresponding 5,10-di-substituted - 10,11 - dihydro-[5H]-dibenzo-[b,e][1,4]-diazepines and the N-oxides of 5,10-disubstituted-[5H]-dibenzo-[b,e][1,4]-diazepin-11(10H)-ones.

It will be understood of course that only those 5,10-disubstituted-[5H]-dibenzo-[b,e][1,4]-diazepin-11(10H)-ones having either a tertiary aminoalkyl group in the 5 position, a tertiary aminoalkyl group in the 10 position, or tertiary aminoalkyl groups in both 5 and 10 positions are capable of forming N-oxides.

The novel compounds of this invention having Formulae I through VI have basic nitrogen groups and their acid addition salts are obtained by neutralization with an acid by conventional methods. For example, the compounds can be treated with at least a stoichiometric amount of the appropriate acid; and depending upon the nature of the solvent employed, the desired salt will separate spontaneously or can be precipitated by the addition of a solvent in which the salt is insoluble. Acid addition salts can also be prepared metathetically by reacting an acid addition salt of this invention with an acid which is stronger than the acid comprising the acid moiety of the starting salt. Pharmacologically acceptable acid addition salts can be prepared using acids, such as sulfuric, hydrochloric, hydrobromic, nitric, phosphoric, benzoic, p-toluenesulfonic, salicylic, acetic, propionic, pamoic, tartaric, citric, succinic acids, and the like. Similarly, acid addition salts can be prepared with acids such as fluosilicic acid, thiocyanic acid, and the like.

The novel hydrocarbyl N-aminoalkyl-N-(2-aminophenyl)anthranilate intermediates of this invention are active as diuretics, and can be administered to animals in order to produce diuresis. The 5-(aminoalkyl)-[5H]-dibenzo-[b,e][1,4]-diazepin-11(10H)-ones are pharmacologically active as inhibitors of pseudocholinesterase, as hypotensive agents, tranquilizers, and psychic energizers. Moreover, the novel 5,10-disubstituted-[5H]-dibenzo-[b,e][1,4]-diazepin-11(10H)-one compounds of this invention, the novel 5-(aminoalkyl-[5H]-dibenzo-[b,e][1,4]-diazepin-11(10H)-one, hydrocarbyl N-aminoalkyl-N-(2-aminophenyl)anthranilate, and hydrocarbyl N-aminoalkyl-N-(2-nitrophenyl)anthranilate intermediates of this invention; and the 5 - (aminoalkyl)-10,11-dihydro-[5H] - dibenzo-[b,e][1,4]-diazepine derivatives of this invention are useful in accordance with U.S. Patents 1,915,334 and 2,075,359 in forming amine fluosilicate mothproofing agents and in accordance with U.S. Patents 2,425,320 and 2,606,155 in forming amine thiocyanate-formaldehyde condensation products for use as pickling inhibitors.

When used in therapy, the novel 5,10-disubstituted-[5H] - dibenzo - [b,e][1,4] - diazepin-11(10H)-ones, the novel 5 - (aminoalkyl)-10,11-dihydro-[5H]-dibenzo-[b,e][1,4]-diazepines and 5-(aminoalkyl)-[5H]-dibenzo-[b,e][1,4]-diazepin-11(10H)-one N-oxide derivatives, the novel hydrocarbyl N - (aminoalkyl)-N-(2-aminophenyl)anthranilate intermediates, and the other pharmacologically active intermediates of this invention can be formulated as the essential active ingredient in novel compositions for administration via oral or parenteral routes. Suitably, the compositions comprise the essential active ingredient and a solid or fluid pharmaceutical carrier. Convenient solid pharmaceutical carriers for solid compositions include, e.g., cornstarch, lactose, dicalcium phosphate, terra alba (calcium sulfate), talc, stearic acid, magnesium stearate, gums, and functionally similar materials. Suitable solid compositions include tablets, pills, capsules, granules, powders, wafers, and cachets. Fluid pharmaceutical carriers for fluid compositions advantageously comprise water; oils, for example, cottonseed oil, sesame oil, and peanut oil; and oil-water emulsions. Appropriate fluid compositions include solutions, suspensions, syrups, oil-water emulsions, and the like.

The following examples are illustrative of the process and products of the present invention, but are not to be construed as limiting.

PREPARATION I

N-(2-nitrophenyl)anthranilic acid

A mixture of 600 g. (3.0 moles) of 1-bromo-2-nitrobenzene, 300 g. (2.2 moles) of anthranilic acid and 300 ml. of n-amyl alcohol was heated on an oil bath in a 2-l. three-neck, round-bottom flask, provided with a mechanical stirrer, a reflux condenser, and a thermometer. After most of the chemicals had dissolved and the mixture had reached a temperature of about 80° to 90° C., stirring was begun and continued while 3.0 g. of powdered copper and 300 g. (2.2 moles) of potassium carbonate were added. The reaction mixture became red, and within about 15 minutes the temperature rose from about 80° to about 120° C. A solid formed which prevented further stirring. The reflux condenser was replaced by a distilling condenser and the water and solvent were distilled. The temperature of the oil bath was increased gradually to 200° to 210° C. and maintained at this temperature for three hours. The oil bath was replaced by a steam bath, 500 ml. of water was poured into the flask, and the excess of 1-bromo-2-nitrobenzene was removed by steam distillation. When distillation of 1-bromo-2-nitrobenzene was substantially completed, the solution was filtered through a sintered glass funnel, and water was added to a total volume of 5 liters (the solution was red). After cooling to about 25° C. overnight and filtering, aqueous hydrochloric acid (1:1) was carefully added to the solution until it was just acid to Congo red. An ochre colored precipitate that formed was collected on a filter, washed with 1500 ml. of water, and dried under reduced pressure at 70° C. There was thus obtained 521 g. (92% yield, based on anthranilic acid) of N-(2-nitrophenyl)anthranilic acid having a melting point of 206° to 214° C.

PREPARATION II

Following the procedure of Preparation I but substituting 4-chloroanthranilic acid, 5-chloro-, 3-methyl-, 4-tert-butyl-, 6-fluoro-, 4,5-dimethyl-, 3-methoxy-4-methyl-, and 4-ethoxy-anthranilic acid for anthranilic acid, there were prepared N-(2-nitrophenyl)-4-chloro-, N-(2-nitrophenyl)-5-chloro-, N-(2-nitrophenyl)-3-methyl-, N-(2-nitrophenyl)-4-tert-butyl-, N-(2-nitrophenyl)-6-fluoro-, N-(2-nitrophenyl) - 4,5 - dimethyl-, N-(2-nitrophenyl)-3-methoxy-4-methyl-, and N-(2-nitrophenyl)-4-ethoxyanthranilic acids, respectively.

PREPARATION III

Following the procedure of Preparation I but substituting 1 - bromo-2-nitro-4 - tert-butylbenzene, 1-bromo-3-ethyl - 2 - nitrobenzene, 1-bromo-4,5-difluoro-2-nitrobenzene, 1-bromo-4,5-di-n-butoxy-2-nitrobenzene, 1-bromo-2-nitro-4,5,6-trimethoxybenzene, and 1-bromo-2-nitro-5-trifluoromethylbenzene for 1-bromo-2-nitrobenzene, there were prepared N-(2-nitro-4-tert-butylphenyl)-, N-(3-ethyl-2-nitrophenyl)-, N-(4,5-difluoro-2-nitrophenyl)-, N-(4,5-di-n-butoxy-2-nitrophenyl)-, N-(2-nitro-4,5,6-trimethoxyphenyl)-, and N-(2-nitro-5-trifluoromethylphenyl)anthranilic acids, respectively.

PREPARATION IV

Following the procedure of Preparation I but substituting 5-chloroanthranilic acid for the anthranilic acid and 1-bromo-4-chloro-2-nitrobenzene for the 1-bromo-2-nitrobenzene, there was prepared N-(4-chloro-2-nitrophenyl)-5-chloroanthranilic acid.

PREPARATION V

Following the procedure of Preparation I but substituting 5-methoxyanthranilic acid for the anthranilic acid and 1-bromo-4-methoxy-2-nitrobenzene for the 1-bromo-2-nitrobenzene there was prepared N-(4-methoxy-2-nitrophenyl)-5-methoxyanthranilic acid.

PREPARATION VI

Methyl N-(2-nitrophenyl)anthranilate

A suspension of 348 g. (1.35 moles) of N-(2-nitrophenyl)anthranilic acid in 10 l. of commercial absolute methanol was heated on a steambath in a 12-l., three-neck, round-bottom flask, provided with a mechanical stirrer, a reflux condenser, and a gas inlet tube, until the acid was dissolved. Hydrogen chloride was then bubbled through the solution for 7 hours, and after about 3 hours a solid precipitated. After cooling the mixture overnight to about 25° C., the solid was recovered on a sintered glass funnel. The solid in the funnel was pressed to remove most of the solvent, and washed twice with 250 ml. portions of methanol. The orange colored compound thus obtained was dried under reduced pressure over sodium hydroxide. There was thus obtained 317 g. (86% yield) of methyl N-(2-nitrophenyl)anthranilate having a melting point of 155° to 157° C. After one recrystallization from methanol is melted at 156° to 157° C.

*Analysis.*—Calc'd for $C_{14}H_{12}N_2O_4$: C, 61.76; H, 4.44; N, 10.29. Found: C, 61.90; H, 4.79; N, 10.46.

Following the same procedure but substituting

N-(2-nitrophenyl)-4-chloroanthranilic acid,
N-(2-nitrophenyl)-3-methyl-,
N-(2-nitrophenyl)-4-tert-butyl-,
N-(4,5-difluoro-2-nitrophenyl)-,
N-(2-nitro-4-tert-butylphenyl)-,
N-(2-nitro-4,5,6-trimethoxyphenyl)-,
N-(2-nitro-5-trifluoromethylphenyl)-,
N-(3-ethyl-2-nitrophenyl)-,
N-(2-nitrophenyl)-5-chloro-,
N-(2-nitrophenyl)-6-fluoro-,
N-(2-nitrophenyl)-4,5-dimethyl-,
N-(2-nitrophenyl)-3-methoxy-4-methyl-,
N-(2-nitrophenyl)-4-ethoxy-,
N-(4-chloro-2-nitrophenyl)-5-chloro-,
N-(4-methoxy-2-nitrophenyl)-5-methoxy-, and
N-(4,5-di-n-butoxy-2-nitrophenyl)anthranilic acids for N-(2-nitrophenyl)anthranilic acid, there were prepared methyl N-(2-nitrophenyl)-4-chloroanthranilate,
methyl N-(2-nitrophenyl)-3-methyl-,
methyl N-(2-nitrophenyl)-4-tert-butyl-,
methyl N-(4,5-difluoro-2-nitrophenyl)-,
methyl N-(2-nitro-4-tert-butylphenyl)-,
methyl N-(2-nitro-4,5,6-trimethoxyphenyl)-,
methyl N-(2-nitro-5-trifluoromethylphenyl)-,
methyl N-(3-ethyl-2-nitrophenyl)-,
methyl N-(2-nitrophenyl)-5-chloro-,
methyl N-(2-nitrophenyl)-6-fluoro-,
methyl N-(2-nitrophenyl)-4,5-dimethyl-,
methyl N-(2-nitrophenyl)-3-methoxy-4-methyl-,
methyl N-(2-nitrophenyl)-4-ethoxy-,
methyl N-(4-chloro-2-nitrophenyl)-5-chloro-,
methyl N-(4-methoxy-2-nitrophenyl)-5-methoxy-, and
methyl N - (4,5-di-n-butoxy-2-nitrophenyl)anthranilates, respectively.

Following the same procedure but substituting ethyl alcohol, butyl alcohol, octyl alcohol, allyl alcohol, 3-butenyl alcohol, propargyl alcohol, cyclopentyl alcohol, 2-cyclopentenyl alcohol, cyclohexylmethyl alcohol, 2-cyclohexenylmethyl alcohol, 2-methylcyclopentyl alcohol, phenol, benzyl alcohol, phenethyl alcohol and p-cresol for methanol, there were prepared ethyl N-(2-nitrophenyl)anthranilate,
butyl N-(2-nitrophenyl)-,
octyl N-(2-nitrophenyl)-,
allyl N-(2-nitrophenyl)-,
3-butenyl N-(2-nitrophenyl)-,
propargyl N-(2-nitrophenyl)-,
cyclopentyl N-(2-nitrophenyl)-,
2-cyclopentenyl N-(2-nitrophenyl)-,
cyclohexylmethyl N-(2-nitrophenyl)-,
2-cyclohexenylmethyl N-(2-nitrophenyl)-,
2-methylcyclopentyl N-(2-nitrophenyl)-,
phenyl N-(2-nitrophenyl)-,
benzyl N-(2-nitrophenyl)-,
phenethyl N-(2-nitrophenyl)-, and
p-tolyl N-(2-nitrophenyl)anthranilates, respectively.

PREPARATION VII

*3-(N-benzylmethylamino)propanol*

A solution of 121.2 g. (1.00 mole) of N-benzylmethylamine in 50 ml. of absolute methanol was added dropwise with stirring under an atmosphere of nitrogen during 10 min. to a solution of 139.0 g. (1.00 mole) of 3-bromopropanol in 200 ml. of absolute methanol in a 1-liter, 3-necked flask fitted with reflux condenser. Gentle refluxing began without external heating about 20 min. after the mixing was completed. The exothermic reaction subsided after about 1 hr., but refluxing was continued by heating and stirring under nitrogen for 16 hrs. The methanol was removed at reduced pressure and the pale yellow syrup that remained was dissolved in 200 ml. of water. The aqueous solution was extracted with two 250-ml. portions of ether, and then made basic with 200 ml. of 20% aqueous sodium hydroxide. The basic solution was extracted with 250 ml. of ether and the ether extract was washed with 100 ml. of water followed by 200 ml. of saturated aqueous sodium chloride. The ether solution was dried over anhydrous magnesium sulfate for 1 hr. and the ether was evaporated. There was thus obtained 144.2 g. of pale yellow oil which was distilled under reduced pressure through a 14" heated Vigreux column. The fraction boiling at 95° to 110° C. and 0.35 to 0.25 mm. of mercury pressure weighed 96.3 g. It was combined with a sample from a previous run weighing 69.8 g. and boiling at 106° to 109° C. and 0.20 to 0.16 mm. of mercury pressure, and redistilled through the same column as originally. There was thus obtained a fraction of 3-(N-benzylmethylamino)propanol weighing 151.7 g. which distilled at 94° to 97° C. and 0.17 to 0.15 mm. of mercury pressure, and having a refractive index $n_D^{25}=1.5203$.

Following the same procedure as described but substituting dibenzylamine for N-benzylmethylamine there was prepared 3-dibenzylaminopropanol.

PREPARATION VIII

*3-(N-benzylmethylamino)propyl chloride and the hydrochloride thereof*

A solution of 200 g. (1.672 moles) of thionyl chloride in 100 ml. of dry benzene was added dropwise with stirring under a nitrogen atmosphere during 1 hr. to a solution of 150 g. (0.836 mole) of 3-(N-benzylmethylamino) propanol in 200 ml. of dry benzene in a 1-l., 3-necked flask fitted with a condenser. After a moderate exothermic reaction had subsided, the mixture was heated to reflux under nitrogen for 8 hrs. and allowed to stand at about 25° C. for about 70 hrs. The excess thionyl chloride and benzene were removed under reduced pressure. The residue was diluted with 200 ml. benzene and the mixture was again concentrated in order to remove the last traces of thionyl chloride. The syrup thus obtained was mixed with 300 ml. of water and extracted with two 250-ml. portions of ether. The aqueous layer was treated with activated charcoal (Darco G–60), filtered, and made basic with 250 g. of cold 20% aqueous sodium hydroxide. The basic solution was extracted with two 250-ml. portions of ether, and the combined ether extracts were washed with water, washed with saturated aqueous sodium chloride, and dried over anhydrous magnesium sulfate for 45 min. After removing the ether there was obtained 139.0 g. of a brown oil which was distilled through a 14" heated Vigreux column under reduced pressure. The 3-(N-benzylmethylamino)propyl chloride free base distilled at 104.5° to 106° C. and 0.60 mm. of mercury pressure. It weighed 120.6 g. and had a refractive index $n_D^{25}=1.5150$.

*Analysis.*—Calc'd for $C_{11}H_{16}ClN$: C, 66.82; H, 8.16; Cl, 17.94; N, 7.08. Found: C, 67.18; H, 7.90; Cl, 17.63; N, 7.19.

A 16.4 g. sample of 3-(N-benzylmethylamino)propyl chloride free base having a boiling point of 88.5° to 86° C. and 0.35 to 0.45 mm. of mercury pressure and refractive index $n_D^{25}=1.5150$ was dissolved in 400 ml. of absolute ether and treated with 40 ml. of 2.5 N hydrogen chloride in absolute ethanol to give 14.0 g. of 3-(N-benzylmethylamino)propyl chloride hydrochloride as colorless crystals melting at 86° to 93° C.

*Analysis.*—Calc'd for $C_{11}H_{17}Cl_2N$: C, 56.42; H, 7.32; Cl, 30.28; N, 5.98. Found: C, 56.21; H, 7.19; Cl, 30.57; N, 6.04.

Following the same procedure as described but substituting 3-dibenzylaminopropanol for 3-(N-benzylmethylamino)propanol, there was prepared 3-dibenzylaminopropyl chloride and the hydrochloride thereof.

EXAMPLE 1

*Preparation of 5-(2-diethylaminoethyl) - 10-(3-demethylaminopropyl) - [5H] - dibenzo - [b,e][1,4] - diazepin-11(10H)-one and the dihydrochloride thereof*

PART A.—METHYL N-(2-DIETHYLAMINOETHYL)-N-(2-NITROPHENYL)ANTHRANILATE HYDROCHLORIDE

To a solution of 31.0 g. (0.113 mole) of methyl N-(2-nitrophenyl)anthranilate in 400 ml. of toluene (dried by distillation and cooled to about 25° C.) was added 5.5 g. (containing 0.119 mole of sodium hydride) of a 55% dispersion of sodium hydride in mineral oil. The mixture was stirred and slowly heated to reflux. A vigorous reaction set in and the mixture was refluxed for 4 hours. After cooling and adding 17.1 g. (0.125 mole) of freshly distilled 2-diethylaminoethyl chloride in 50 ml. of dry toluene, the solution was refluxed with stirring for 6 hours. Stirring was continued overnight at about 25° C. To the cooled solution was added 25 ml. of water and after adjustment to about pH 2 with cold 2 N hydrochloric acid, the two layers that formed were separated. The aqueous layer was extracted twice with toluene and, after filtering, was made basic with aqueous potassium hydroxide. The basic aqueous solution was extracted with ether, and the ether extract was washed twice with water and once with saturated aqueous sodium chloride. The ether extract was dried over anhydrous magnesium sulfate, filtered, and dry hydrogen chloride was added. The hydrochloride of methyl N-(2-diethylaminoethyl)-N-(2-nitrophenyl)anthranilate precipitated; it was recovered on a filter and recrystallized from a 1:3 mixture of isopropyl alcohol and ether to give 2.5 g. crystals melting at 172.5° to 174° C.

*Analysis.*—Calc'd for $C_{20}H_{26}ClN_3O_4$: C, 58.89; H, 6.43; N, 10.30. Found: C, 58.61; H, 6.43; N, 10.52.

PART B.—METHYL N-(2-DIETHYLAMINOETHYL)-N-(2-AMINOPHENYL)ANTHRANILATE AND THE DIHYDROCHLORIDE THEREOF

A solution of 13.3 g. of methyl N-(2-diethylaminoethyl) - N-(2-nitrophenyl)anthranilate hydrochloride in water was made basic with dilute aqueous potassium hydroxide and extracted three times with ether. The combined ether extracts were washed with water, dried over anhydrous sodium sulfate, and concentrated to yield 11.1 g. of methyl N-(2-diethylaminoethyl)-N-(2-nitrophenyl) anthranilate free base.

The free base was dissolved in 150 ml. of absolute methanol and hydrogenated at 40 lbs. pressure for 2 hours in the presence of 15 ml. of Raney nickel suspension. The pressure drop occured during the first 8 to 10 min. The reaction mixture was filtered to remove catalyst and concentrated to dryness. The residue was taken up in ether, and the ether solution of methyl N-(2-diethylaminoethyl) - N - (2-aminophenyl) anthranilate was dried over anhydrous magnesium sulfate. Introduction of dry hydrogen chloride caused 12.5 g. of methyl N-(2-diethylaminoethyl) - N-(2 - aminophenyl)anthranilate dihydrochloride to precipitate which was recovered on a filter. It melted at 192° to 193° C. after one recrystallization from a mixture of 40 ml. of methanol, 40 ml. of isopropyl alcohol, and 65 ml. of anhydrous ether.

*Analysis.*—Calc'd for $C_{20}H_{29}Cl_2N_3O_2$: C, 57.97; H, 7.05; N, 10.12; Cl, 17.11. Found: C, 57.60; H, 6.99; N, 10.30; Cl, 17.15.

PART C.—5-(2-DIETHYLAMINOETHYL)-[5H]-DIBENZO-[b,e][1,4]-DIAZEPIN-11(10H)-ONE

A solution of 1.2 g. of methyl N-(2-diethylaminoethyl)-N-(2-aminophenyl)anthranilate dihydrochloride was converted to the free base by treatment with aqueous potassium hydroxide and the free base was recovered by extraction with ether. The syrup, obtained upon removal of ether, was mixed with a small amount of powdered soft glass and heated at a temperature of 110° to 215° C. over an interval of 3 hrs. The resulting syrup was dissolved in ether and filtered, and the ether solution concentrated to a small volume. Upon the addition of technical hexane (Skellysolve B, essentially a mixture of isomeric hexanes having a boiling range of 140° to 160° Fahrenheit), crystallization occurred. There was thus obtained 480 mg. of 5-(2-diethylaminoethyl)-[5H]-dibenzo-[b,e][1,4]-diazepin-11(10H)-one having a melting point of 132.5° to 133.5° C.

*Analysis.*—Calc'd for $C_{19}H_{23}N_3O$: C, 73.75; H, 7.49; N, 13.58. Found: C, 73.60; H, 7.07; N, 13.64.

PART D.—5 - (2-DIETHYLAMINOETHYL)-10-(3-DIMETHYLAMINOPROPYL) - [5H] - DIBENZO - [b,e][1,4] - DIAZEPIN-11(10H)-ONE AND THE DIHYDROCHLORIDE THEREOF

A solution of 9.27 g. (30 millimoles) of 5-(2-diethylaminoethyl) - [5H] - dibenzo - [b,e][1,4] - diazepin-11(10H)-one in 80 ml. of toluene, dried by distillation, was mixed with 1.48 g. (32 millimoles of sodium hydride) of 52% sodium hydride dispersion in mineral oil. The reaction mixture was refluxed for four hours, cooled, and 4.02 g. (33 millimoles) of 3-dimethylaminopropyl chloride in 12 ml. of dry toluene was added followed by 10 ml. of distilled dimethylformamide. This mixture was refluxed for six hours, cooled to room temperature, diluted with 150 ml. water, and extratced with ether. The combined ether extracts were washed with water, dried with anhydrous sodium sulfate, filtered, and concentrated to yield 11.5 g. of 5-(2-diethylaminoethyl)-10-(3-dimethylaminopropyl) - [5H] - dibenzo - [b,e][1,4] - diazepin-11(10H)-one as a syrup. The syrup was taken up in anhydrous ether, dried thoroughly over anhydrous magnesium sulfate, filtered in a dry room, and dry hydrogen chloride was introduced. There was thus obtained 5-(2-diethylaminoethyl) - 10 - (3-dimethylaminopropyl-[5H]-dibenzo - [b,e][1,4]-diazepin-11(10H)-one dihydrochloride as a white fluffy powder melting at 109° to 111.5° C. The product is very hygroscopic.

Following the procedure described above, but substituting 3-(N-benzylmethylamino)propyl chloride, 3-dibenzylaminopropyl chloride, 3-diethylaminopropyl chloride, 2-diethylaminoethyl chloride, 2 - (di-n-butylamino)ethyl chloride, 2-diisopropylaminoethyl chloride, 2-dimethylaminoethyl chloride, 4-dimethylaminobutyl chloride, 2-(1-pyrrolidyl)ethyl chloride, 2-[1-(2,2-dimethylpyrrolidyl)]ethyl chloride, 2-(1-piperidyl)ethyl chloride, 2-[1-(4-propylpiperidyl)]ethyl chloride, 2-(1-hexamethyleneimino)ethyl chloride, 2 - [1 - (2 - methylhexamethyleneimino)]ethyl chloride, 2-(4-morpholyl)ethyl chloride, 2-[4-(2-methylmorpholyl)]ethyl chloride, and 2-(4-thiamorpholyl)ethyl chloride for 3-dimethylaminopropyl chloride, there were prepared 5-(2-diethylaminoethyl)-10-[3-(N-benzylmethylamino)-propyl]-, 5-(2-diethylaminoethyl) - 10-(3-dibenzylaminopropyl)-, 5-(2-diethylaminoethyl)-10-(3-diethylaminopropyl)-, 5-(2-diethylaminoethyl-10-(2-diethylaminoethyl)-, 5-(2-diethylaminoethyl)-10-(2 - di-n-butylaminoethyl)-, 5-(2-diethylaminoethyl)-10-(2-diisopropylaminoethyl)-, 5-(2-diethylaminoethyl)-10-(2 - dimethylaminoethyl)-, 5-(2-diethyaminoethyl)-10-(4-dimethylaminobutyl)-, 5-(2-diethylaminoethyl-10-[2-(1-pyrrolidyl)ethyl]-, 5-(2-diethylaminoethyl)-10-{2-[1-(2,2-dimethylpyrrolidyl)]-ethyl}-, 5-(2-diethylaminoethyl)-10-[2 - (1-piperidyl)ethyl]-, 5-(2-diethylaminoethyl)-10-{2-[1-(4-propylpiperidyl)]ethyl}-, 5(2-diethylaminoethyl)-10-[2-(1-hexamethyleneimino)ethyl]-, 5-(2-diethylaminoethyl) - 10 - {2 - [1 - (2 - methylhexamethyleneimino)]-ethyl}-, 5 - (2 - diethylaminoethyl) - 10 - [2 - (4 - morpholyl)ethyl]-, 5 - (2-dimethylaminoethyl)-10-{2-[4-(2-methylmorpholyl)]ethyl}-, and 5-(2-diethylaminoethyl)-10 - [2 - (4 - thiamorpholyl)ethyl] - [5H] - dibenzo-[b,e][1,4]-diazepin-11(10H)-ones, respectively, and the dihydrochlorides thereof.

Following the procedure of Example 8, Part B, but substituting 5-(2-diethylaminoethyl)-10-(3-N-benzylmethylaminopropyl) - [5H] - dibenzo - [b,e,][1,4] - diazepin-11(10H)-one and 5-(2-diethylaminoethyl)-10-(3-dibenzylaminopropyl - [5H] - dibenzo - [b,e][1,4] - diazepin-11(10H)-one for methyl N-(3-N-benzylmethylaminopropyl)-N-(2-nitrophenyl)anthranilate, there were prepared 5 - (2 - diethylaminoethyl) - 10 - (3 - methylaminopropyl) - [5H] - dibenzo - [b,e][1,4] diazepin - 11(10H)-one and 5 - (2 - diethylaminoethyl-10-(3-aminopropyl)-[5H]-dibenzo-[b,e,][1,4]-diazepin-11(10H)-one and the dihydrochlorides thereof

EXAMPLE 2

*Preparation of 5-(2-diethylaminoethyl)-10-methyl-[5H]-dibenzo[b,e][1,4]-diazepin-11(10H)one methiodide*

A solution of 3.09 g. (10 millimoles) of 5-(2-diethylaminoethyl - [5H] - dibenzo - [b,e][1,4] - diazepin - 11-(10)H-one in 45-ml. of dry toluene was mixed with 490 mg. (10.5 millimoles of sodium hydride) of 52% sodium hydride dispersed in mineral oil. The reaction mixture was refluxed for 4 hours, cooled, and 4.75 g. (34 millimoles) of methyl iodide in 15 ml. of dry toluene was added. This mixture was refluxed for 14 hours, cooled, and 65 ml. of water was added. The mixture was shaken and the aqueous and organic layers separated. The aqueous layer was re-extracted with toluene, and then lyophilized. There was thus obtained 4.5 g. of crude product which on crystallization from 70 ml. of hot isopropyl alcohol gave 3.05 g. of 5-(2-diethylaminoethyl-10-methyl-[5H] - dibenzo - [b,e][1,4]-diazepin-11(10H)-one methiodide having a melting point of 221.5° to 224° C. Recrystallization from isopropyl alcohol gave an analytical sample melting at 219.5° to 221° C.

*Analysis.*—Calc'd for $C_{21}H_{28}N_3IO$: C, 54.20; H, 6.06; N, 9.02. Found: C, 54.30; H, 6.07; N, 8.88.

In the same manner but substituting ethyl iodide, n-propyl iodide, isopropyl iodide, n-butyl bromide, and sec-butyl iodide, for methyl iodide, there were prepared 5-(2-diethylaminoethyl) - 10 - ethyl-[5H]-dibenzo-[b,e][1,4]-diazepin-11(10H)-one ethiodide, 5-(2-diethylaminoethyl)-10-propyl - [5H] - dibenzo-[b,e][1,4]-diazepin-11(10H)-one propiodide, 5-(2-diethylaminoethyl)-10-isopropyl-[5H]-dibenzo-[b,e][1,4]-diazepin - 11(10H)-one isopropiodide, 5-(2-diethylaminoethyl)-10-n-butyl-[5H]-dibenzo-[b,e][1,4]-diazepin-11(10H)-one butyl bromide, and 5 - (2-diethylaminoethyl)-10-sec-butyl-[5H]-dibenzo-[b,e][1,4]-diazepin-11(10H)-one sec-butiodide.

EXAMPLE 3

*Preparation of 5-(3-dimethylaminopropyl)-10,11-dihydro-[5H]-dibenzo-[b,e][1,4]-diazepine*

PART A.—METHYL N-(3-DIMETHYLAMINOPROPYL)-N-(2 - NITROPHENYL)ANTHRANILATE HYDROCHLORIDE

To a solution of 10.89 g. (40 millimoles) of methyl N-(2-nitrophenyl)anthranilate in 120 ml. of toluene, dried by distillation and cooled to room temperature, was added 1.75 g. (containing 40 millimoles of sodium hydride) of 55% sodium hydride dispersion. The mixture was stirred and slowly heated to reflux. A vigorous reaction set in and the mixture was refluxed for 4 hours. After cooling and adding 5.1 g. (42 millimoles) of freshly distilled 3-dimethylaminopropyl chloride in 25 ml. of dry toluene, the solution was refluxed with stirring for 6 hours. Stirring was continued overnight at about 25° C. To the cooled solution was added 25 ml. of water and after adjustment to about pH 2 with cold 2 N hydrochloric acid, the two layers that formed were separated. The aqueous layer was extracted twice with toluene and, after filtering, was made basic with aqueous potassium hydroxide. The basic aqueous solution was extracted with ether, and the ether extract was washed twice with water and once with saturated aqueous sodium chloride. The ether extract was dried over anhydrous magnesium sulfate, filtered, and dry hydrogen chloride was added. The hydrochloride of methyl N-3-dimethylaminopropyl) - N - (2-nitrophenyl)-anthranilate precipitated; it was recovered on a filter and recrystallized from 100 ml. of isopropyl alcohol to give 4.5 g. of yellow to orange crystals melting at 187° to 190° C. After a second recrystallization from isopropyl alcohol, the melting point was 190° to 192° C.

*Analysis.*—Calc'd for $C_{19}H_{24}ClN_3O_4$: C, 57.9; H, 6.14; Cl, 9.00; N, 10.65. Found: C, 58.4; H, 6.40; Cl, 9.13; N, 10.64.

PART B.—METHYL N-(3-DIMETHYLAMINOPROPYL)-N-(2 - AMINOPHENYL)ANTHRANILATE AND THE DIHYDROCHLORIDE THEREOF

A solution of 2.5 g. of methyl N-(3-dimethylaminopropyl)-N-(2-nitrophenyl)anthranilate hydrochloride (Part A, above) in water was made basic with dilute aqueous potassium hydroxide and extracted three times with ether. The combined ether extracts were washed with water, dried over anhydrous sodium sulfate, and concentrated to yield 2.2 g. of methyl N-(3-dimethylaminopropyl)-N-(2-nitrophenyl)anthranilate free base.

The free base was dissolved in 50 ml. of absolute methanol and hydrogenated at 50 lbs. pressure for 2 hours in the presence of 2 to 3 ml. of Raney nickel slurry. The pressure drop occurred during the first 10 to 15 min. The reaction mixture was filtered to remove catalyst and concentrated to dryness. The residue was taken up in ether, and the ether solution of methyl N-(3-dimethylaminopropyl)-N-(2-aminophenyl)anthranilate was dried over anhydrous magnesium sulfate. Introduction of dry hydrogen chloride caused 2.26 g. of methyl N-(3-dimethylaminopropyl)-N-(2 - aminophenyl)anthranilate dihydrochloride to precipitate which was recovered on a filter. It melted at 205° to 206° C. after one recrystallization from a mixture of 20 ml. methanol and 20 ml. of isopropyl alcohol.

*Analysis.*—Calc'd for $C_{19}H_{27}Cl_2N_3O_2$: C, 57.1; H, 6.79; N, 10.5; Cl, 17.72. Found: C, 56.96; H, 6.92; N, 10.21; Cl, 17.89.

PART C.—5 - (3 - DIMETHYLAMINOPROPYL) - [5H]-DIBENZO-[b,e][1,4]-DIAZEPIN-11(10H)-ONE

A solution of 3.07 g. (7.7 millimoles) of methyl N-(3-dimethylaminopropyl) - N - (2-aminophenyl)anthranilate dihydrochloride was converted to the free base by treatment with aqueous potassium hydroxide and the free base was recovered by extraction with ether. The syrup, obtained upon removal of ether, was mixed with a small amount of powdered soft glass and heated at a temperature of 120° to 155° C. over an interval of 1½ hrs. The reaction mixture was triturated in ether and filtered, and the ether solution concentrated. Upon the addition of technical hexane (Skellysolve B, essentially a mixture of isomeric hexanes having a boiling range of 140° to 160° Fahrenheit), crystallization occurred. There was thus obtained 360 mg. of 5-(3-dimethylaminopropyl)-[5H]-dibenzo-[b,e][1,4]-diazepin-11(10H)-one having a melting point of 144° to 145° C. Trituration with ether raised the melting point to 147.5° to 149° C.

*Analysis.*—Calc'd for $C_{18}H_{21}N_3O$: C, 73.19; H, 7.17; N, 14.23. Found: C, 72.62; H, 6.94; N, 14.80.

A greatly increased yield (75 to 80%) was obtained by heating the starting material, dissolved in methanol, at 100° C. in an autoclave for 12 hours. Concentration of the methanol solution caused crystallization and the crystals melted at 149° to 150° C. Ring closure was also effected by refluxing in methanol for 40 hours.

PART D.—5 - (3-DIMETHYLAMINOPROPYL)-10-11-DIHYDRO-[5H]-DIBENZO-[b,e][1,4]-DIAZEPINE

A solution of 1.48 g. (4 millimoles) of 5-(3-dimethylaminopropyl) - [5H] - dibenzo - [b,e][1,4] - diazepin-11-(10H)-one, 290 mg. of lithium aluminum hydride in 150 ml. of anhydrous ether, and 25 ml. of tetrahydrofuran (freshly distilled from lithium aluminum hydride) was refluxed for 30 hours. To the cooled solution was added 4 ml. of 10% aqueous sodium hydroxide and the ether layer was decanted. The residue was washed twice with fresh ether, and the combined ether solutions were concentrated to give a syrup which crystallized. After recovering the crystals on a filter, recrystallization from ether gave 800 mg. (3 crops) of crude product having a melting point of 95° to 96.5° C. Recrystalliaztion from acetone gave 600 mg. of 5-(3-dimethylaminopropyl)-10,11-dihydro-[5H]-dibenzo-[b,e][1,4]-diazepine having a melting point of 100.5° to 102° C.

Analysis.—Calc'd for $C_{18}H_{23}N_3$: C, 76.83; H, 8.24; N, 14.93. Found: C, 76.78; H, 7.90; N, 15.03.

EXAMPLE 4

Preparation of the N-oxide of 5-(3-dimethylaminopropyl)-[5H]-dibenzo-[b,e][1,4]-diazepin-11(10H)-one To a solution, cooled in ice, of 2.07 g. of 5-(3-dimethylaminopropyl) - [5H] - dibenzo - [b,e][1,4] - diazepin-11-(10H)-one, in 13 ml. of 95% ethanol was added 1.5 ml. of 30% hydrogen peroxide. The solution was held at about 25° C. for 2.5 days and excess hydrogen peroxide was then decomposed by stirring the solution with 135 mg. of 5% palladium-on-charcoal (washed with water) for one hour at about 25° C. followed by 15 minutes on the steam bath. The mixture was filtered, and about 20 ml. of water was added. The alcohol was removed under reduced pressure and the aqueous layer was extracted with ether to remove excess starting material. The aqueous layer was concentrated to a syrup and the N-oxide of 5-(3-dimethylaminopropyl)-[5H]-dibenzo-[b,e][1,4]-diazepin-11(10H)-one was crystallized from acetone. It had a melting point of 176.5° to 178° C.

Analysis.—Calc'd for $C_{18}H_{21}N_3O_2$: C, 69.43; H, 6.80; N, 13.50. Found: C, 69.28; H, 6.95; N, 13.20.

EXAMPLE 5

Preparation of 5-(2-diethylaminoethyl)-10,11-dihydro-[5H]-dibenzo-[b,e][1,4]-diazepine dihydrochloride Following the procedure of Example 3, Part D, but substituting 5 - (2 - diethylaminoethyl) - [5H] - dibenzo-[b,e][1,4]-diazepin-11 (10H) - one for 5 - (3 - dimethylaminopropyl) - [5H] - dibenzo - [b,e][1,4] - diazepin-11(10H)-one, there was prepared 5-(2-diethylaminoethyl)-10,11-dihydro - [5H] - dibenzo[b,e][1,4]-diazepine, which was converted to the dihydrochloride having a melting point of 221.5° to 223° C.

Analysis.—Calc'd for $C_{19}H_{27}Cl_2N_3$: C, 61.95; H, 7.39; N, 11.41. Found: C, 61.83; H, 7.45; N, 11.11.

EXAMPLE 6

Preparation of the N-oxide of 5-(2-diethylaminoethyl)-[5H]-dibenzo[b,e][1,4]-diazepin-11(10H)-one Following the procedure of Example 4 but substituting 5 - (2-diethylaminoethyl) - [5H] - dibenzo-[b,e][1,4]-diazepin - 11(10H) - one for 5-(3 - dimethylaminopropyl)-[5H] - dibenzo - [b,e][1,4] - diazepin-11(10H)-one, there was prepared the N-oxide of 5-(2-diethylaminoethyl)-[5H]-dibenzo-[b,e][1,4]-diazepin-11(10H)-one having a melting point of 165° C.

Analysis.—Calc'd for $C_{19}H_{23}N_3O_2$: C, 70.13; H, 7.12; N, 12.91. Found: C, 69.85; H, 7.08; N, 13.07.

EXAMPLE 7

Preparation of 5-(3-diethylaminopropyl)-10,11-dihydro-[5H]-dibenzo-[b,e][1,4]-diazepine PART A.—METHYL N-(3-DIETHYLAMINOPROPYL)-N-(2-NITROPHENYL)ANTHRANILATE AND THE HYDROCHLORIDE THEREOF Following the procedure of Example 3, Part A, but substituting 3-diethylaminopropyl chloride for 3-dimethylaminopropyl chloride, there was prepared methyl N-(3-diethylaminopropyl) - N - (2-nitrophenyl)anthranilate hydrochloride having a melting point of 124° to 125.5° C.

Analysis.—Calc'd for $C_{21}H_{28}ClN_3O_4$: C, 59.78; H, 6.69; N, 9.96. Found: C, 59.50; H, 6.71; N, 9.96.

PART B.—METHYL N-(3-DIETHYLAMINOPROPYL)-N-(2-AMINOPHENYL)ANTHRANILATE DIHYDROCHLORIDE

In the same manner as described in Example 3, Part B, but substituting methyl N-(3-diethylaminopropyl)-N-(2-nitrophenyl)anthranilate hydrochloride for methyl N-(3-dimethylaminopropyl)-N-(2-nitrophenyl)anthranilate hydrochloride, there was prepared methyl N-(3-diethylaminopropyl) - N - (2-aminophenyl)anthranilate dihydrochloride having a melting point of 199° to 200° C.

Analysis.—Calc'd for $C_{21}H_{31}Cl_2N_3O_2$: C, 58.8; H, 7.30; N, 9.82. Found: C, 58.61; H, 7.42; N, 9.69.

PART C.—5-(3-DIETHYLAMINOPROPYL)-[5H]-DIBENZO-[b,e][1,4]-DIAZEPIN-11(10H)-ONE

Following the procedure of Example 3, Part C, but substituting methyl N-(3-diethylaminopropyl)-N-(2 - aminophenyl)anthranilate dihydrochloride for methyl N-(3-dimethylaminopropyl)-N-(2 - aminophenyl)anthranilate dihydrochloride, there was prepared 5 - (3 - diethylaminopropyl)-[5H]-dibenzo-[b,e][1,4]-diazepin - 11(10H)-one having a melting point of 115.5° to 117° C.

Analysis.—Calc'd for $C_{20}H_{25}N_3O$: C, 74.27; H, 7.79; N, 12.99. Found: C, 74.35; H, 7.58; N, 13.19.

PART D.—5-(3-DIETHYLAMINOPROPYL)-10-11-DIHYDRO-[5H]-DIBENZO-[b,e][1,4]-DIAZEPINE

Following the procedure of Example 3, Part D, but substituting 5 - (3 - diethylaminopropyl)-[5H]-dibenzo-[b,e] [1,4]-diazepin-11(10H)-one for 5-(3-dimethylaminopropyl) - [5H]-dibenzo - [b,e][1,4] - diazepin-11(10H)-one, there was prepared 5-(3-diethylaminopropyl)10,11-dihydro-[5H]-dibenzo-[b,e][1,4]-diazepine, having a melting point of 81° to 83° C.

Analysis.—Calc'd for $C_{20}H_{27}N_3$: C, 77.62; H, 8.80; N, 13.58. Found: C, 77.47; H, 8.39; N, 13.38.

EXAMPLE 8

Preparation of 5-(3-methylaminopropyl)-10,11-dihydro-[5H]-dibenzo-[b,e][1,4]-diazepine dihydrochloride PART A.—METHYL N-(3-N-BENZYLMETHYLAMINOPROPYL)-N-(2-NITROPHENYL)ANTHRANILATE AND THE HYDROCHLORIDE THEREOF A mixture of 54.45 g. (0.20 mole) of methyl N-(2-nitrophenyl)anthranilate, 9.80 g. (0.21 mole) of a 51% dispersion of sodium hydride in mineral oil, and 300 ml. of dimethylformamide was refluxed with stirring under a nitrogen atmosphere for 3 hours. The mixture became dark purple and was allowed to cool a little before 39.48 g. (0.20 mole) of freshly prepared 3-(N-benzylmethylamino)propyl chloride was added. The reaction mixture was refluxed with stirring for 6 hrs. and stirring was continued for about 18 hours at about 25° C. under nitrogen. The dimethylformamide was removed at 115° C. and 1.5 mm. of mercury pressure during four hrs. The syrup that remained (103 g.) was mixed with 850 ml. of ether, washed with five 300-ml. portions of water and with 300 ml. of saturated aqueous sodium chloride. The ether solution was dark and was treated with Darco G-60. The activated charcoal was removed by filtration and the filtrate was dried over anhydrous magnesium sulfate. After adding 77 ml. of 2.5 N anhydrous ethanolic hydrogen chloride a dark gum separated. It was washed several times with ether and thoroughly macerated with 1 liter of water. The water-insoluble material (10.0 g.) was separated by filtration and the aqueous filtrate containing N-(3 - N - benzylmethylaminopropyl)-N-(2-nitrophenyl)anthranilate hydrochloride was made basic with 50 ml. of 20% aqueous sodium hydroxide. The basic solution was extracted with 800 ml. of ether, washed with water and saturated sodium chloride solution, and dried over anhydrous magnesium sulfate. After removing the ether there was obtained 48.3 g. of methyl N-(3-N-benzylmethylaminopropyl)-N-(2-nitrophenyl)anthranilate free base as red-brown syrup which was used in the next step of the synthesis without further purification.

The hydrochloride of the free base melted at 201° to 202° C.

PART B.—5-(3-METHYLAMINOPROPYL)-[5H]-DIBENZO-[b,e][1,4]-DIAZEPIN-11(10H)-ONE AND THE HYDROCHLORIDE THEREOF

A solution of 48.2 g. (0.111 mole) of methyl N-(3-N-benzylmethylaminopropyl) - N - (2-nitrophenyl)anthranilate in 200 ml. of absolute methanol was hydrogenated for 2 hrs. at about 25° C. in the presence of 5.0 g. of 10% palladium-on-charcoal catalyst at an initial pressure of 50 p.s.i. The catalyst was removed by filtration and the filtrate containing methyl N-(3-methylaminopropyl)-N-(2-aminophenyl)anthranilate was diluted with 200 ml. of absolute methanol. The resulting solution was refluxed under a nitrogen atmosphere for 18 hrs. and the methanol was removed under reduced pressure. The residue thus obtained was washed with 200 ml. of water, dissolved in 200 ml. of 1 N hydrochloric acid and the insoluble material was removed by ether extraction. The clear, green aqueous solution was made basic with 40 ml. of 20% aqueous sodium hydroxide and extracted with 1 l. of diethyl ether. The ether extract was washed with water and saturated aqueous sodium chloride and dried over anhydrous magnesium sulfate. After removing the ether, the crude product was recrystallized twice from benzene to give 5.1 g. of 5-(3-methylaminopropyl)-[5H]-dibenzo-[b,e][1,4]-diazepin-11(10H) - one crystals melting at 146.5° to 147.5° C.

*Analysis.*—Calc'd for $C_{17}H_{19}N_3O$: C, 72.57; H, 6.81; N, 14.94. Found: C, 72.78; H, 6.77; N, 14.68.

The hydrochloride of the free base melted at 187.5° to 188° C.

PART C. 5 - (3-METHYLAMINOPROPYL)-10,11-DIHYDRO-[5H]-DIBENZO-[b,e][1,4]-DIAZEPINE AND THE DIHYDROCHLORIDE THEREOF

A solution of 4.50 g. (0.015 mole) of 5-(3-methylaminopropyl) - [5H] - dibenzo - [b,e][1,4] - diazepin-11 (10H)-one in 150 ml. of tetrahydrofuran was added dropwise with stirring under nitrogen during 30 min. to a slurry of 1.82 g. (0.048 mole) of lithium aluminum hydride in 100 ml. of tetrahydrofuran. The reaction mixture was refluxed with stirring for 73 hrs. To the reaction mixture was slowly added 6 ml. of ethyl acetate followed by 5 ml. of water, and the mixture was filtered through a pad of Celite (a diatomaceous earth). The filtrate was dried over anhydrous magnesium sulfate and the solvents were removed to give 4.45 g. of 5-(3-methylaminopropyl)-10,11-dihydro-[5H]-dibenzo-[b,e][1,4]-diazepine as a pale yellow viscous oil. The oil was dissolved in 125 ml. of absolute ether, filtered, and treated with anhydrous ethereal hydrogen chloride. The resulting highly hygroscopic crystals of 5-(3-methylaminopropyl-10,11-dihydro-[5H]-dibenzo-[b,e][1,4]-diazepine dihydrochloride were dried under reduced pressure at 40° C.

EXAMPLE 9

*Preparation of 5,10-bis(dimethylaminopropyl)-3-chloro-[5H]-dibenzo-[b,e][1,4]-diazepin - 11(10H) - one and the dihydrochloride thereof*

PART A. METHYL N-(3-DIMETHYLAMINOPROPYL)-N-(2-NITROPHENYL)-4-CHLOROANTHANILATE HYDROCHLORIDE

Following the procedure of Example 3, Part A, but substituting methyl N-(2-nitrophenyl) - 4 - chloroanthranilate for methyl N-(2-nitrophenyl)anthranilate, there was prepared methyl N-(3-dimethylaminopropyl)-N-(2-nitrophenyl)-4-chloroanthranilate hydrochloride having a melting point of 168° to 170.5° C.

*Analysis.*—Calc'd for $C_{19}H_{23}Cl_2N_3O_4$: C, 53.28; H, 5.41; N, 9.81; Cl, 16.56. Found: C, 53.18; H, 5.95; N, 9.72; Cl, 16.58.

PART B. METHYL N-(3-DIMETHYLAMINOPROPYL)-N-(2-AMINOPHENYL) - 4 - CHLOROANTHRANILATE AND THE DIHYDROCHLORIDE THEREOF

Following the procedure of Example 3, Part B, but substituting methyl N - (3 - dimethylaminopropyl)-N-(2-nitrophenyl)-4-chloroanthranilate hydrochloride for methyl N-(3 - dimethylaminopropyl)-N-(2-nitrophenyl)anthranilate hydrochloride, there was prepared methyl N-(3-dimethylaminopropyl)-N-(2 - aminophenyl) - 4 - chloroanthranilate, and the dihydrochloride thereof having a melting point of 192.5° to 194.5° C.

*Analysis.*—Calc'd for $C_{19}H_{26}Cl_3N_3O_2$: N, 9.66. Found: N, 9.90.

PART C. 5-(3-DIMETHYLAMINOPROPYL) - 3 - CHLORO-[5H]-DIBENZO-[b,e][1,4]-DIAZEPIN-11(10H)-ONE

Following the procedure of Example 3, Part C, but substituting methyl N-(3-dimethylaminopropyl) - N - (2-aminophenyl) - 4 - chloroanthranilate dihydrochloride for methyl N-(3-dimethylaminopropyl)-N-(2 - aminophenyl) anthranilate dihydrochloride, there was prepared 5-(3-dimethylaminopropyl)-3-chloro-[5H]-dibenzo - [b,e][1,4]-diazepin-11(10H)-one having a melting point of 145.5° to 146.5° C.

*Analysis.*—Calc'd for $C_{18}H_{20}ClN_3O$: C, 65.54; H, 6.11; N, 12.74. Found: C, 65.54; H, 6.11; N, 13.00.

PART D. 5,10-BIS(3-DIMETHYLAMINOPROPYL)-3-CHLORO-[5H]-DIBENZO-[b,e][1,4]-DIAZEPIN-11(10H) - ONE AND THE DIHYDROCHLORIDE THEREOF

Following the procedure of Example 1, part D, but substituting 5 - (3 - dimethylaminopropyl)-3-chloro-[5H]-dibenzo-[b,e][1,4]-diazepin-11(10H)-one for 5-(2-diethylaminoethyl) - [5H] - dibenzo - [b,e][1,4] - diazepin - 11-(10H)-one, there was prepared 5,10-bis(3-dimethylaminopropyl) - 3 - chloro - [5H] - dibenzo-[b,e][1,4]-diazepin-11(10H)-one and the dihydrochloride thereof.

EXAMPLE 10

Following the procedure of Example 3, Part A, but substituting methyl N-(2-nitrophenyl)-3-methyl-, methyl N-(2-nitrophenyl)-4-tert-butyl-, methyl N-(4,5-difluoro-2-nitrophenyl-, methyl N - (2 - nitro - 4 - tert-butylphenyl)-, methyl N-(2-nitro-4,5,6-trimethoxyphenyl)-, methyl N-(2-nitro-5-trifluoromethylphenyl)-, methyl N-(3-ethyl-2-nitrophenyl)-, methyl N-(2-nitrophenyl)-5-chloro-, methyl N-(2 - nitrophenyl)6 - fluoro-, methyl N-(2-nitrophenyl)-4,5-dimethyl-, methyl N-(2-nitrophenyl)-3-methoxy-4-methyl-, methyl N-(2-nitrophenyl)-4-ethoxy-, methyl N-(4-chloro-2-nitrophenyl)-5-chloro-, methyl N-(4-methoxy-2-nitrophenyl)-5-methoxy-, and methyl N-(4,5-di-n-butoxy-2-nitrophenyl)anthranilates for methyl N-(2-nitrophenyl) anthranilate, there were prepared methyl N-(3-dimethylaminopropyl)-N-(2-nitrophenyl)-3-methylanthranilate hydrochloride, methyl N-(3-dimethylaminopropyl)-N-(2-nitrophenyl)-4-tert-butyl-, methyl N-(3-dimethylaminopropyl)-N-(4,5-difluoro-2-nitrophenyl)-, methyl N-(3-dimethylaminopropyl) - N - (2-nitro-4-tert-butylphenyl)-, methyl N - (3-dimethylaminopropyl)-N-(2-nitro-4,5,6-trimethoxyphenyl)-, methyl N-(3-dimethylaminopropyl)-N-(2-nitro-5-trifluoromethylphenyl-, methyl N-(3-dimethylaminopropyl)-N-(3-ethyl-2-nitrophenyl)-, methyl N-(3-dimethylaminopropyl)-N-(2-nitrophenyl)-5-chloro-, methyl N-(3 - dimethylaminopropyl) - N-(2-nitrophenyl)-6-fluoro-, methyl N-(3-dimethylaminopropyl)-N-2-nitrophenyl)-4,5-dimethyl-, methyl N-(3-dimethylaminopropyl)-N-(2-nitrophenyl)-3-methoxy-4-methyl-, methyl N-(3-dimethylaminopropyl)-N-(2-nitrophenyl)-4-ethoxy-, methyl N-(3-dimethylaminopropyl) - N - (4 - chloro - 2-nitrophenyl)-5-chloro-, methyl N - (3 - dimethylaminopropyl)-N-(4-methoxy-2-nitrophenyl)-5-methoxy-, and methyl N-(3-dimethylaminopropyl) - N - (4,5-di-n-butoxy-2-nitrophenyl) anthranilate hydrochlorides, respectively.

EXAMPLE 11

Following the procedure of Example 3, Part A, but substituting 3-dibenzylaminopropyl chloride, 2-(di-n-butylamino)ethyl chloride, 2-diisopropylaminoethyl chloride, 2-dimethylaminoethyl chloride, 4-dimethylaminobutyl chloride, 2-(1-pyrrolidyl)ethyl chloride, 2-[1-(2,2-dimethylpyrrolidyl)]-ethyl chloride, 2-(1-piperidyl)ethyl chloride, 2-[1-(4-propylpiperidyl)]ethyl chloride, 2-(1-hexamethyleneimino)ethyl chloride, 2-[1-(2-methylhexamethyleneimino)]ethyl chloride, 2-(4-morpholyl)ethyl chloride, 2-[4-(2-methylmorpholyl)]ethyl chloride, and 2-(4-thiamorpholyl)ethyl chloride for 3-dimethylaminopropyl chloride, there were prepared methyl N-(3-dibenzylaminopropyl)-, methyl N-[2-(di-n-butylamino)ethyl]-, methyl N-(2-diisopropylaminoethyl)-, methyl N-(2-dimethylaminoethyl)-, methyl N-(4-dimethylaminobutyl)-, methyl N-[2-(1-pyrrolidyl)ethyl]-, methyl N-{2-[1-(2,2-dimethylpyrrolidyl)]ethyl}-, methyl N-[2-(1-piperidyl)ethyl]-, methyl N-{2-[1-(4-propylpiperidyl)]ethyl}-, methyl N-[2-(1-hexamethyleneimino)ethyl]-, methyl N-{2-[1-(2-methylhexamethyleneimino)]ethyl}-, methyl N-[2-(4-morpholyl)ethyl]-, methyl N-{2-[4-(2-methylmorpholyl)]ethyl}-, and methyl N-[2-(4-thiamorpholyl)ethyl]-N-(2-nitrophenyl)anthranilate hydrochlorides, respectively.

EXAMPLE 12

Following the procedure of Example 3, Part B, but substituting methyl N-(3-dimethylaminopropyl)-N-(2-nitrophenyl)-3-methylanthranilate hydrochloride, methyl N-(3-dimethylaminopropyl)-N-(2-nitrophenyl)-4-tert-butyl-, methyl N-(3-dimethylaminopropyl)-N-(4,5-difluoro-2-nitrophenyl)-, methyl N-(3-dimethylaminopropyl)-N-(2-nitro-4-tert-butylphenyl)-, methyl N-(3-dimethylaminopropyl)-N-(2-nitro-4,5,6-trimethoxyphenyl)-, methyl N-(3-dimethylaminopropyl)-N-(2-nitro-5-trifluoromethylphenyl)-, methyl N-(3-dimethylaminopropyl)-N-(3-ethyl-2-nitrophenyl)-, methyl N-(3-dimethylaminopropyl)-N-(2-nitrophenyl)-5-chloro-, methyl N-(3-dimethylaminopropyl)-N-(2-nitrophenyl)-6-fluoro-, methyl N-(3-dimethylaminopropyl)-N-(2-nitrophenyl)-4,5-dimethyl-, methyl N-(3-dimethylaminopropyl)-N-(2-nitrophenyl)-3-methoxy-4-methyl-, methyl N-(3-dimethylaminopropyl)-N-(2-nitrophenyl)-4-ethoxy-, methyl N-(3-dimethylaminopropyl)-N-(4-chloro-2-nitrophenyl)-5-chloro-, methyl N-(3-dimethylaminopropyl)-N-(4-methoxy-2-nitrophenyl)-5-methoxy-, methyl N-(3-dimethylaminopropyl)-N-(4,5-di-n-butoxy-2-nitrophenyl)anthranilate hydrochlorides, methyl N-(3-dibenzylaminopropyl)-, methyl N-[2-(di-n-butylamino)ethyl]-, methyl N-(2-diisopropylaminoethyl)-, methyl N-(2-dimethylaminoethyl)-, methyl N-(4-dimethylaminobutyl)-, methyl N-[2-(1-pyrrolidyl)ethyl]-, methyl N-{2-[1-(2,2-dimethylpyrrolidyl)]ethyl}-, methyl N-[2-(1-piperidyl)ethyl]-, methyl N-{2-[4-(propylpiperidyl)]ethyl}-, methyl N-[2-(1-hexamethyleneimino)ethyl]-, methyl N-{2-[1-(2-methylhexamethyleneimino)]ethyl}-, methyl N-[2-(4-morpholyl)ethyl]-, methyl N-{2-[4-(2-methylmorpholyl)]ethyl}-, and methyl N-[2-(4-thiamorpholyl)ethyl]-N-(2-nitrophenyl)anthranilate hydrochlorides for methyl N-(3-dimethylaminopropyl)-N-(2-nitrophenyl)anthranilate hydrochloride, there were prepared methyl N-(3-dimethylaminopropyl)-N-(2-aminophenyl)-3-methylanthranilate, methyl N-(3-dimethylaminopropyl)-N-(2-aminophenyl)-4-tert-butyl-, methyl N-(3-dimethylaminopropyl)-N-(2-amino-4,5-difluorophenyl)-, methyl N-(3-dimethylaminopropyl)-N-(2-amino-4-tert-butylphenyl)-, methyl N-(3-dimethylaminopropyl)-N-(2-amino-4,5,6-trimethoxyphenyl)-, methyl N-(3-dimethylaminopropyl)-N-(2-amino-5-trifluoromethylphenyl)-, methyl N-(3-dimethylaminopropyl)-N-(2-amino-3-ethyl-phenyl)-, methyl N-(3-dimethylaminopropyl)-N-(2-aminophenyl)-5-chloro-, methyl N-(3-dimethylaminopropyl)-N-(2-aminophenyl)-6-fluoro-, methyl N-(3-dimethylaminopropyl)-N-(2-aminophenyl)-4,5-dimethyl-, methyl N-(3-dimethylaminopropyl)-N-(2-aminophenyl)-3-methoxy-4-methyl-, methyl N-(3-dimethylaminopropyl)-N-(2-aminophenyl)-4-ethoxy-, methyl N-(3-dimethylaminopropyl)-N-(2-amino-4-chlorophenyl)-5-chloro-, methyl N-(3-dimethylaminopropyl)-N-(2-amino-4-methoxyphenyl)-5-methoxy-, methyl N-(3-dimethylaminopropyl)-N-(2-amino-4,5-di-n-butoxyphenyl)anthranilate dihydrochlorides, methyl N-(3-aminopropyl)-, methyl N-[2-(di-n-butylamino)ethyl]-, methyl N-(2-diisopropylaminoethyl)-, methyl N-(2-dimethylaminoethyl)-, methyl N-(4-dimethylaminobutyl)-, methyl N-[2-(1-pyrrolidyl)ethyl]-, methyl N-{2-[1-(2,2-dimethylpyrrolidyl)]ethyl}-, methyl N-[2-(1-piperidyl)ethyl]-, methyl N-{2-[1-(4-propylpiperidyl)]ethyl}-, methyl N-[2-(1-hexamethyleneimino)ethyl]-, methyl N-{2-[1-(2-methylhexamethyleneimino)]ethyl}-, methyl N-[2-(4-morpholyl)ethyl]-, methyl N-{2-[4-(2-methylmorpholyl)]ethyl}-, and methyl N-[4-(thiamorpholyl)ethyl]-N-(2-aminophenyl)anthranilates, respectively, and their dihydrochlorides.

EXAMPLE 13

Following the procedure of Example 3, Part C, but substituting methyl N-(3-dimethylaminopropyl)-N-(2-aminophenyl)-3-methylanthranilate, methyl N-(3-dimethylaminopropyl)-N-(2-aminophenyl)-4-tert-butyl-, methyl N-(3-dimethylaminopropyl)-N-(2-amino-4,5-difluorophenyl)-, methyl N-(3-dimethylaminopropyl)-N-(2-amino-4-tert-butylphenyl)-, methyl N-(3-dimethylaminopropyl)-N-(2-amino-4,5,6-trimethoxyphenyl)-, methyl N-(3-dimethylaminopropyl)-N-(2-amino-5-trifluoromethylphenyl)-, methyl N-(3-dimethylaminopropyl)-N-(2-amino-3-ethyl)-, methyl N-(3-dimethylaminopropyl)-N-(2-aminophenyl)-5-chloro-, methyl N-(3-dimethylaminopropyl)-N-(2-aminophenyl)-6-fluoro-, methyl N-(3-dimethylaminopropyl)-N-(2-aminophenyl)-4,5-dimethyl-, methyl N-(3-dimethylaminopropyl)-N-(2-aminophenyl)-3-methoxy-4-methyl-, methyl N-(3-dimethylaminopropyl)-N-(2-aminophenyl)-4-ethoxy-, methyl N-(3-dimethylaminopropyl)-N-(4-chloro-2-aminophenyl)-5-chloro-, methyl N-(3-dimethylaminopropyl)-N-(4-methoxy-2-aminophenyl)-5-methoxy-, methyl N-(3-dimethylaminopropyl)-N-(4,5-di-n-butoxy-2-aminophenyl)anthranilate dihydrochlorides, methyl N-(3-aminopropyl)-, methyl N-[2-(di-n-butylamino)ethyl]-, methyl N-(2-diisopropylaminoethyl)-, methyl N-(2-dimethylaminoethyl)-, methyl N-(4-dimethylaminobutyl)-, methyl N-[2-(1-pyrrolidyl)ethyl]-, methyl N-{2-[1-(2,2-dimethylpyrrolidyl)]ethyl}-, methyl N-[2-(1-piperidyl)ethyl]-, methyl N-{2-[1-(4-propylpiperidyl)]ethyl}-, methyl N-[2-(1-hexamethyleneimino)ethyl]-, methyl N-{2-[1-(2-methylhexamethyleneimino)]ethyl}-, methyl N-[2-(4-morpholyl)ethyl]-, methyl N-{2-[4-(2-methylmorpholyl)]ethyl}-, and methyl N-[2-(4-thiamorpholyl)ethyl]-N-(2-aminophenyl)anthranilate dihydrochlorides for methyl N-(3-dimethylaminopropyl)-N-(2-aminophenyl)anthranilate dihydrochloride, there were prepared 5-(3-dimethylaminopropyl)-4-methyl-[5H]-dibenzo-[b,e][1,4]-diazepin-11(10H)one, 5-(3-dimethylaminopropyl)-3-tert-butyl-, 5-(3-dimethylaminopropyl)-7,8-difluoro-, 5-(3-dimethylaminopropyl)-8-tert-butyl-, 5-(3-dimethylaminopropyl)-6,7,8-trimethoxy-, 5-(3-dimethylaminopropyl)-7-trifluoromethyl-, 5-(3-dimethylaminopropyl)-9-ethyl-, 5-(3-dimethylaminopropyl)-2-chloro-, 5-(3-dimethylaminopropyl)-1-fluoro-, 5-(3-dimethylaminopropyl)-2,3-dimethyl-, 5-(3-dimethylaminopropyl-4-methoxy-3-methyl-, 5-(3-dimethylaminopropyl)-3-ethoxy-, 5-(3-dimethylaminopropyl)-2,8-dichloro-, 5-(3-dimethylaminopropyl)-2,8-dimethoxy-, 5-(3-dimethylaminopropyl)-7,8-di-n-butoxy-, 5-(3-aminopropyl)-, 5-(2-di-n-butylaminoethyl)-, 5-(2-diisopropylaminoethyl)-, 5-(2-dimethylaminoethyl)-, 5-(4-dimethylaminobutyl)-, 5-[2-(1-pyrrolidyl)ethyl]-, 5-{2-[1-(2,2-dimethylpyrrolidyl)]ethyl}-, 5-[2-(1-piperidyl)ethyl]-, 5-{2-[1-(4-propylpiperidyl)]ethyl}-, 5-[2-(1-hexamethyleneimino)ethyl]-, 5-{2-[1-(2-methylhexamethyleneimino)]ethyl}-, 5-[2-(4-morpholyl)ethyl]-, 5-{2-[4-(2-methylmorpholyl)]ethyl}-, and 5-[2-(4-thiamorpholyl)ethyl]-[5H]-dibenzo-[b,e][1,4]-diazepin-11(10H)-ones, respectively.

EXAMPLE 14

Following the procedure of Example 3, Part D, but substituting
5-(3-dimethylaminopropyl)-3-chloro-[5H]-dibenzo-[b,e][1,4]-diazepin-11(10H)-one,
5-(3-dimethylaminopropyl)-4-methyl-,
5-(3-dimethylaminopropyl)-3-tert-butyl-,
5-(3-dimethylaminopropyl)-7,8-difluoro-,
5-(3-dimethylaminopropyl)-8-tert-butyl-,
5-(3-dimethylaminopropyl)-6,7,8-trimethoxy-,
5-(3-dimethylaminopropyl)-7-trifluoromethyl-,
5-(3-dimethylaminopropyl)-9-ethyl-,
5-(3-dimethylaminopropyl)-2-chloro-,
5-(3-dimethylaminopropyl)-1-fluoro-,
5-(3-dimethylaminopropyl)-2,3-dimethyl-,
5-(3-dimethylaminopropyl)-4-methoxy-3-methyl-,
5-(3-dimethylaminopropyl)-3-ethoxy-,
5-(3-dimethylaminopropyl)-2,8-dichloro-,
5-(3-dimethylaminopropyl)-2,8-dimethoxy-,
5,(3-dimethylaminopropyl)-7,8-di-n-butoxy-,
5-(3-aminopropyl)-,
5-(2-di-n-butylaminoethyl)-,
5-(2-diisopropylaminoethyl)-,
5-(2-dimethylaminoethyl)-,
5-(4-dimethylaminobutyl)-,
5-[2-(1-pyrrolidyl)ethyl]-,
5-{2-[1-(2,2-dimethylpyrrolidyl)]ethyl}-,
5-[2-(1-piperidyl)ethyl]-,
5-{2-[1-(4-propylpiperidyl)]ethyl}-,
5-[2-(1-hexamethyleneimino)ethyl]-,
5-{2-[1-(2-methylhexamethyleneimino)]ethyl}-,
5-[2-(4-morpholyl)ethyl]-,
5-{2-[4-(2-methylmorpholyl)]ethyl}-, and
5-[2-(4-thiamorpholyl)ethyl]-[5H]-dibenzo-[b,e][1,4]-diazepin-11(10H)-ones for
5-(3-dimethylaminopropyl)-5H-dibenzo-[b,e][1,4]-diazepin-11(10H)-one, there were prepared
5-(3-dimethylaminopropyl)-3-chloro-10,11-dihydro-[5H]-dibenzo-[b,e][1,4]-diazepine,
5-(3-dimethylaminopropyl)-10,11-dihydro-4-methyl-,
5-(3-dimethylaminopropyl)-10,11-dihydro-3-tert-butyl-,
5-(3-dimethylaminopropyl)-7,8-difluoro-10,11-dihydro-,
5-(3-dimethylaminopropyl)-10,11-dihydro-8-tert-butyl-,
5-(3-dimethylaminopropyl)-10,11-dihydro-6,7,8,-trimethoxy-,
5-(3-dimethylaminopropyl)-10,11-dihydro-7-trifluoromethyl-,
5-(3-dimethylaminopropyl)-10,11-dihydro-9-ethyl-,
5-(3-dimethylaminopropyl)-2-chloro-10,11-dihydro-,
5-(3-dimethylaminopropyl)-10,11-dihydro-1-fluoro-,
5-(3-dimethylaminopropyl)-10,11-dihydro-2,3-dimethyl-,
5-(3-dimethylaminopropyl)-10,11-dihydro-4-methoxy-3-methyl-,
5-(3-dimethylaminopropyl)-10,11-dihydro-3-ethoxy-,
5-(3-dimethylaminopropyl)-2,8-dichloro-10,11-dihydro-,
5-(3-dimethylaminopropyl)-10,11-dihydro-2,8-dimethoxy-,
5-(3-dimethylaminopropyl)-7,8-di-n-butoxy-10,11-dihydro-,
5-(3-aminopropyl)-10,11-dihydro-,
5-(2-di-n-butylaminoethyl)-10,11-dihydro-,
5-(2-diisopropylaminoethyl)-10,11-dihydro-,
5-(2-dimethylaminoethyl)-10,11-dihydro-,
5-(4-dimethylaminobutyl)-10,11-dihydro-,
5-[2-(1-pyrrolidyl)ethyl]-10,11-dihydro-,
5-{2-[1-(2,2-dimethylpyrrolidyl)]ethyl}-10,11-dihydro-,
5-[2-(1-piperidly)ethyl]-10,11-dihydro-,
5-{2-[1-(4-propylpiperidyl)]-ethyl}-10,11-dihydro-,
5-[2-(1-hexamethyleneimino)ethyl]-10,11-dihydro-,
5-{2-[1-(2-methylhexamethyleneimino)]ethyl}-10,11-dihydro-,
5-[2-(4-morpholyl)ethyl]-10,11-dihydro-,
5-{2-[4-(2-methylmorpholyl)]ethyl}-10,11-dihydro, and
5-[2-(4-thiamorpholyl)ethyl]-10,11-dihydro-[5H]-dibenzo-[b,e][1,4]-diazepines, respectively.

EXAMPLE 15

Following the procedure of Example 4 but substituting
5-(3-dimethylaminopropyl)-3-chloro-[5H]-dibenzo-[b,e][1,4]-diazepin-11(10H)-one,
5-(3-dimethylaminopropyl)-4-methyl-,
5-(3-dimethylaminopropyl)-3-tert-butyl-,
5-(3-dimethylaminopropyl)-7,8-difluoro-,
5-(3-dimethylaminopropyl)-8-tert-butyl,
5-(3-dimethylaminopropyl)-6,7,8-trimethoxy-,
5-(3-dimethylaminopropyl)-7-trifluoromethyl-,
5-(3-dimethylaminopropyl)-9-ethyl-,
5-(3-dimethylaminopropyl)-2-chloro-,
5-(3-dimethylaminopropyl)-1-fluoro-,
5-(3-dimethylaminopropyl)-2,3-dimethyl-,
5-(3-dimethylaminopropyl)-4-methoxy-3-methyl-,
5-(3-dimethylaminopropyl)-3-ethoxy-,
5-(3-dimethylaminopropyl)-2,8-dichloro-,
5-(3-dimethylaminopropyl)-2,8-dimethoxy-,
5-(3-dimethylaminopropyl)-7,8-di-n-butoxy-,
5-(3-diethylaminopropyl)-,
5-(2-di-n-butylaminoethyl)-,
5-(2-diisopropylaminoethyl)-,
5-(2-dimethylaminoethyl)-,
5-(4-dimethylaminobutyl)-,
5-[2-(1-pyrrolidyl)ethyl]-,
5-{2-[1-(2,2-dimethylpyrrolidyl)]ethyl}-,
5-[2-(1-piperidyl)ethyl]-,
5-{2-[1-(4-propylpiperidyl)]ethyl}-,
5-[2-(1-hexamethyleneimino)ethyl]-,
5-{2-[1-(2-methylhexamethyleneimino)]ethyl}-,
5-[2-(4-morpholyl)ethyl]-,
5-{2-[4-(2-methylmorpholyl)]ethyl}-, and
5-[2-(4-thiamorpholyl)ethyl]-[5H]-dibenzo-[b,e][1,4]-diazepin-11(10H)-ones for
5-(3-dimethylaminopropyl)-[5H]dibenzo-[b,e][1,4]-diazepin-11(10H)-one, there were prepared the N-oxides of
5-(3-dimethylaminopropyl)-3-chloro-[5H]-dibenzo-[b,e][1,4]-diazepin-11(10H)-one,
5-(3-dimethylaminopropyl)-4-methyl-,
5-(3-dimethylaminopropyl)-3-tert-butyl-,
5-(3-dimethylaminopropyl)-7,8-difluoro-,
5-(3-dimethylaminopropyl)-8-tert-butyl-,
5-(3-dimethylaminopropyl)-6,7,8-trimethoxy-,
5-(3-dimethylaminopropyl)-7-trifluoromethyl-,
5-(3-dimethylaminopropyl)-9-ethyl-,
5-(3-dimethylaminopropyl)-2-chloro-,
5-(3-dimethylaminopropyl)-1-fluoro-,
5-(3-dimethylaminopropyl)-2,3-dimethyl-,
5-(3-dimethylaminopropyl)-4-methoxy-3-methyl-,
5-(3-dimethylaminopropyl)-3-ethoxy-,
5-(3-dimethylaminopropyl)-2,8-dichloro-,
5-(3-dimethylaminopropyl)-2,8-dimethoxy-,
5-(3-dimethylaminopropyl)-7,8-di-n-butoxy-,
5-(3-diethylaminopropyl)-,
5-(2-di-n-butylaminoethyl)-,
5-(2-diisopropylaminoethyl)-,
5-(2-dimethylaminoethyl)-,
5-(4-dimethylaminobutyl)-,
5-[2-(1-pyrrolidyl)ethyl]-,
5-{2-[1-(2,2-dimethylpyrrolidyl)]ethyl}-,
5-[2-(1-piperidyl)ethyl]-,
5-{2-[1-(4-propylpiperidyl)]ethyl}-,
5-[2-(1-hexamethyleneimino)-ethyl]-,
5-{2-[1-(2-methylhexamethyleneimino)]ethyl}-,
5-[2-(4-morpholyl)ethyl]-,
5-{2-[4-(2-methylmorpholyl)]ethyl}-, and
5-[2-(4-thiamorpholyl)ethyl]-[5H]-dibenzo-[b,e][1,4]-diazepin-11(10H)-ones respectively.

EXAMPLE 16

Following the procedure of Example 2 but substituting
5-(3-dimethylaminopropyl)-3-chloro-[5H]-dibenzo-
   [b,e][1,4]-diazepin-11(10H)-one,
5-(3-dimethylaminopropyl)-4-methyl,
5-(3-dimethylaminopropyl)-3-tert-butyl-,
5-(3-dimethylaminopropyl)-7,8-difluoro-,
5-(3-dimethylaminopropyl)-8-tert-butyl-,
5-(3-dimethylaminopropyl)-6,7,8-trimethoxy-,
5-(3-dimethylaminopropyl)-7-trifluoromethyl-,
5-(3-dimethylaminopropyl)-9-ethyl-,
5-(3-dimethylaminopropyl)-2-chloro,
5-(3-dimethylaminopropyl)-1-fluoro-,
5-(3-dimethylaminopropyl)-2,3-dimethyl-,
5-(3-dimethylaminopropyl)-4-methoxy-3-methyl-,
5-(3-dimethylaminopropyl)-3-ethoxy-,
5-(3-dimethylaminopropyl)-2,8-dichloro-,
5-(3-dimethylaminopropyl)-2,8-dimethoxy-,
5-(3-dimethylaminopropyl)-7,8-di-n-butoxy-,
5-(3-methylaminopropyl)-,
5-(3-aminopropyl)-,
5-(3-diethylaminopropyl)-,
5-(2-diethylaminoethyl)-,
5-(2-di-n-butylaminoethyl)-,
5-(2-diisopropylaminoethyl)-,
5-(2-dimethylaminoethyl)-,
5-(4-dimethylaminobutyl)-,
5-[2-(1-pyrrolidyl)ethyl]-,
5-{2-[1-(2,2-dimethylpyrrolidyl)]ethyl}-,
5-[2-(1-piperidyl)ethyl]-,
5-{2-[1-(4-propylpiperidyl)]ethyl}-,
5-[2-(1-hexamethyleneimino)-ethyl]-,
5-{2-[1-(2-methylhexamethyleneimino)]ethyl}-,
5-[2-(4-morpholyl)ethyl]-,
5-{2-[4-(2-methylmorpholyl)]ethyl}-, and
5-[2-(4-thiamorpholylethyl]-[5H]-dibenzo-[b,e][1,4]-
   diazepin-11(10H)-ones for
5-(2-diethylaminoethyl)-[5H]-dibenzo-[b,e][1,4]-
   diazepin-11(10H)-one, there were prepared
5-(3-dimethylaminopropyl)-3-chloro-10-methyl-[5H]-
   dibenzo-[b,e][1,4]-diazepin-11(10H)-one methiodide,
5-(3-dimethylaminopropyl)-4,10-dimethyl-,
5-(3-dimethylaminopropyl)-10-methyl-3-tert-butyl-,
5-(3-dimethylaninopropyl)-7,8-difluoro-10-methyl-,
5-(3-dimethylaminopropyl)-10-methyl-8-tert-butyl-,
5-(3-dimethylaminopropyl)-10-methyl-6,7,8-trimethoxy-,
5-(3-dimethylaminopropyl)-10-methyl-7-trifluoro-
   methyl-,
5-(3-dimethylaminopropyl)-9-ethyl-10-methyl-,
5-(3-dimethylaminopropyl)-2-chloro-10-methyl-,
5-(3-dimethylaminopropyl)-1-fluoro-10-methyl-,
5-(3-dimethylaminopropyl)-2,3,10-trimethyl-,
5-(3-dimethylaminopropyl)-3,10-dimethyl-4-methoxy-,
5-(3-dimethylaminopropyl)-3-ethoxy-10-methyl-,
5-(3-dimethylaminopropyl)-2,8-dichloro-10-methyl-,
5-(3-dimethylaminopropyl)-2,8-dimethoxy-10-methyl-,
5-(3-dimethylaminopropyl)-7,8-di-n-butoxy-10-methyl-,
5-(3-methylaminopropyl)-10-methyl-,
5-(3-aminopropyl)-10-methyl,
5-(3-diethylaminopropyl)-10-methyl-,
5-(2-di-n-butylaminoethyl)-10-methyl-,
5-(2-diisopropylaminoethyl)-10-methyl-,
5-(2-dimethylaminoethyl)-10-methyl-,
5-(4-dimethylaminobutyl)-10-methyl-,
5-[2-(1-pyrrolidyl)ethyl]-10-methyl-,
5-{2-[1-(2,2-dimethylpyrrolidyl)]-ethyl}-10-methyl-,
5-[2-(1-piperidyl)ethyl]-10-methyl-,
5-{2-[1-(4-propylpiperidyl)]ethyl}-10-methyl-,
5-[2-(1-hexamethyleneimino)ethyl]-10-methyl-,
5-{2-[1-(2-methylhexameithyleneimino)]ethyl}-10-
   methyl-,
5-[2-(4-morpholyl)ethyl]-10-methyl-,
5-{2-[4-(2-methylmorpholyl)]ethyl}-10-methyl-, and
5-[2-(4-thiamorpholy)ethyl]-10-methyl-[5H]-dibenzo-
   [b,e][1,4]-diazepin-11(10H)-one methiodides, respectively.

EXAMPLE 17

Following the procedure of Example 1, Part D, but
substituting 5-(3-dimethylaminopropyl)-4-methyl-,
5-(3-dimethylaminopropyl)-3-tert-butyl-,
5-(3-dimethylaminopropyl)-7,8-difluoro-,
5-(3-dimethyaminopropyl)-8-tert-butyl
5-(3-dimethylaminopropyl)-6,7,8-trimethoxy-,
5-(3-dimethylaminopropyl)-7-trifluoromethyl-,
5-(3-dimethylaminopropyl)-9-ethyl-,
5-(3-dimethylaminopropyl)-2-chloro-,
5-(3-dimethylaminopropyl)-1-fluoro-,
5-(3-dimethylaminopropyl)-2,3-dimethyl-,
5-(3-dimethylaminopropyl)-4-methoxy-3-methyl-,
5-(3-dimethylamino-propyl-3-ethoxy-,
5-(3-dimethylaminopropyl)-2,8-dichloro-,
5-(3-dimethylaminopropyl)-2,8-dimethoxy,
5-(3-dimethylaminopropyl)-7,8,-di-n-butoxy-,
5-(3-methylaminopropyl)-,
5-(3-aminopropyl)-,
5-(3-dimethylaminopropyl)-,
5-(2-di-n-butylaminoethyl)-,
5-(2-diisopropylaminoethyl)-,
5-(2-dimethylaminoethyl)-,
5-(4-dimethylaminobutyl)-,
5-[2-(1-pyrrolidyl)ethyl],
5-{2-[1-(2,2-dimethylpyrrolidyl)]ethyl}-,
5-[2-(1-piperidyl)ethyl]-,
5-{2-[1-(4-propylpiperidyl)]ethyl}-,
5-[2-(1-hexamethyleneimino)-ethyl]-,
5-{2-[1-(2-methylhexamethyleneimino)]ethyl}-,
5-[2-(4-morpholyl)ethyl]-,
5-{2-[4-(2-methylmorpholyl)]ethyl}-, and
5-[2-(4-thiamorpholyl)ethyl] - [5H]-dibenzo-[b,e][1,4]-
   diazepin-11(10H)-ones for 5-(2-diethylaminoethyl)-
   [5H]-dibenzo-[b,e][1,4]-diazepin-11(10H)-one,
there were prepared 5,10-bis(3-dimethylaminopropyl)-4-
   methyl-,
5,10-bis(3-dimethylaminopropyl)-3-tert-butyl-,
5,10-bis(3-dimethylaminoproyl)-7,8-difluoro-,
5,10-bis(3-dimethylaminopropyl)-8-tert-butyl-,
5,10-bis(3-dimethylaminopropyl)-6,7,8-trimethoxy-,
5,10-bis(3-dimethylaminopropyl)-7-trifluoromethyl-,
5,10-bis(3-dimethylaminopropyl)-9-ethyl-,
5,10-bis(3-dimethylaminopropyl)-2-chloro-,
5,10-bis(3-dimethylaminopropyl)-1-fluoro-,
5,10-bis(3-dimethylaminopropyl)-2,3-dimethyl-,
5,10-bis(3-dimethylaminopropyl-3-methyl-4-methoxy-,
5,10,bis(3-dimethylaminopropyl)-3-ethoxy-,
5,10-bis(3-dimethylaminopropyl)-2,8-dichloro-,
5.10-bis(3-dimethylaminopropyl)-2,8-dimethoxy-,
5,10-bis(3-dimethylaminopropyl)-7,8-di-n-butoxy - [5H]-
   dibenzo-[b,e][1,4]-diazepin-11(10H)-ones and dihydrochlorides; and
5-(3-methylaminopropyl)-,
5-(3-aminopropyl)-,
5-(3-dimethylaminopropyl)-,
5-(2-di-n-butylaminoethyl)-,
5-(2-diisopropylaminoethyl)-,
5-(2-dimethylaminoethyl)-,
5-4-dimethylaminobutyl)-,
5-[2-(1-pyrrolidyl)ethyl]-,
5-{2-[1-(2,2-dimethylpyrrolidyl)ethyl]-, 5-[2-(1-piperidyl)ethyl]-,
5-{2-[1-(4-propylpiperidyl)]ethyl}-,
5-{2-[1-(2-methylhexamethyleneimino)]ethyl}-,
5-{2-[1-(2-methylhexamethyleneimino)]ethyl}-,
5-[2-(4-morpholyl)ethyl]-,
5-{2-[4-(2-methylmorpholyl)]ethyl}-, and
5-[2-(4-thiamorpholyl)ethyl] - 10 - (3 - dimethylaminopropyl) - [5H] - dibenzo-[b,e][1,4]-dizepin-11(10H)-ones and the dihydrochlorides thereof, respectively.

I claim:
1. A compound selected from the group consisting of (1) 5,10-di(aminoalkyl)-[5H]-dibenzo-[b,e][1,4]-diazepin-11(10H)-ones having the formula

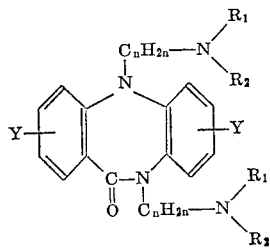

wherein $R_1$ and $R_2$ taken separately are selected from the group consisting of hydrogen and lower-alkyl, and taken together with —N< constitute a saturated heterocyclic amino radical

of from 5 to 7 nuclear atoms, inclusive, selected from the group consisting of pyrrolidino, 2-methylpyrrolidino, 2-ethylpyrrolidino, 2,2-dimethylpyrrolidino, 3,4-dimethylpyrrolidino, 2-isopropylpyrrolidino, 2-sec-butylpyrrolidino, morpholino, 2-ethylmorpholino, 2-ethyl-5-methylmorpholino, 3,3-dimethylmorpholino, thiamorpholino, 3-methylthiamorpholino, 2,3,6-trimethylthiamorpholino, piperidino, 2-methylpiperidino, 3-methylpiperidino, 4-methylpiperidino, 4-propylpiperidino, 2-propylpiperidino, 4-isopropylpiperidino, hexamethyleneimino, 2-methylhexamethyleneimino, 3,6-dimethyl-hexamethyleneimino, and homomorpholino; —$C_nH_{2n}$— is alkylene having at least 2 carbon atoms between the valences; n is an integer from 2 to 4, inclusive; and Y is selected from the group consisting of hydrogen, chlorine, fluorine, trifluoromethyl, lower-alkyl, and lower-alkoxy, and (2) acid addition and quaternary ammonium salts thereof.

2. A compound of claim 1 in its free base form.
3. A compound of the formula

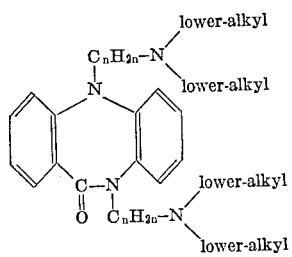

wherein —$C_nH_{2n}$— is branched or straight chain alkylene having at least 2 carbon atoms between the valences, and n is an integer from 2 to 4, inclusive.

4. 5-(2-diethylaminoethyl) - 10 - (3 - dimethylaminopropyl)-[5H]-dibenzo-[b,e][1,4]-diazepin-11(10H)-one.

5. A pharmacologically acceptable acid addition salt of a 5,10-di(aminoalkyl)-[5H]-dibenzo-[b,e][1,4]-diazepin-11(10H)-one having the formula

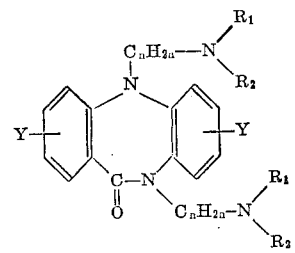

wherein $R_1$ and $R_2$ taken separately are selected from the group consisting of hydrogen and lower-alkyl, and taken together with —N< constitute a saturated heterocyclic amino radical

of from 5 to 7 nuclear atoms, inclusive selected from the group consisting of pyrrolidino, 2-methylpyrrolidino, 2-ethylpyrrolidino, 2,2-dimethylpyrrolidino, 3,4-dimethylpyrrolidino, 2-isopropylpyrrolidino, 2-sec-butylpyrrolidino, morpholino, 2-ethylmorpholino, 2-ethyl-5-methylmorpholino, 3,3-dimethylmorpholino, thiamorpholino, 3-methylthiamorpholino, 2,3,6 - trimethylthiamorpholino, piperpidino, 2-methylpiperidino, 3-methylpiperidino, 4-methylpiperidino, 4-propylpiperidino, 2-propylpiperidino, 4-isopropylpiperidino, hexamethyleneimino, 2-methylhexamethylene-imino, 3,6-dimethylhexamethyleneimino, and homomorphlino; —$C_nH_{2n}$— is alkylene having at least 2 carbon atoms between the valences; n is an integer from 2 to 4, inclusive; and Y is selected from the group consisting of hydrogen, chlorine, fluorine, trifluoromethyl, lower-alkyl, and lower-alkoxy.

6. A pharmacologically acceptable acid addition salt of a compound of the formula

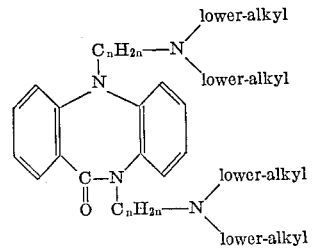

where —$C_nH_{2n}$— is branched or straight chain alkylene having at least 2 carbon atoms between the valences and n is an integer from 2 to 4, inclusive.

7. 5-(2-diethylaminoethyl) - 10 - (3 - dimethylaminopropyl) - [5H] - dibenzo - [b,e][1-,4]-diazepin-11(10H)-one dihydrochloride.

References Cited by the Examiner
UNITED STATES PATENTS

| | | | |
|---|---|---|---|
| 2,666,051 | 1/1954 | Hafliger et al. | 260—239 |
| 2,852,510 | 9/1958 | Hoffmann et al. | 260—239.3 |
| 3,025,288 | 3/1962 | Schindler et al. | 260—239 |
| 3,046,300 | 7/1962 | Sletzinger et al. | 260—471 |
| 3,054,822 | 9/1962 | Schorr et al. | 260—471 |
| 3,084,155 | 4/1963 | Winthrop et al. | 260—239.3 |
| 3,150,125 | 9/1964 | Schmutz et al. | 260—239.3 |
| 3,205,234 | 9/1965 | Schumann | 260—296 |

OTHER REFERENCES

Culvenor "Rev. of Pure and Applied Chem.," vol. 3, No. 2, pp. 83–114 (1953).

WALTER A. MODANCE, *Primary Examiner.*
NICHOLAS S. RIZZO, *Examiner.*
JOHN T. MILLER, ROBERT T. BOND,
*Assistant Examiners.*